(12) United States Patent
Celik et al.

(10) Patent No.: US 8,467,816 B2
(45) Date of Patent: *Jun. 18, 2013

(54) SHORT MESSAGE SERVICE NETWORK PLUG-IN

(75) Inventors: Feyzi Celik, Hopkinton, MA (US); Marcin Nowak, Westborough, MA (US); Burak Say, Ankara (TR)

(73) Assignee: Lupine Investments LLC, Wilmington, DE (US)

( * ) Notice: Subject to any disclaimer, the term of this patent is extended or adjusted under 35 U.S.C. 154(b) by 60 days.

This patent is subject to a terminal disclaimer.

(21) Appl. No.: 13/016,470

(22) Filed: Jan. 28, 2011

(65) Prior Publication Data

US 2011/0130158 A1    Jun. 2, 2011

Related U.S. Application Data

(63) Continuation of application No. 12/253,739, filed on Oct. 17, 2008, now Pat. No. 7,881,736, which is a continuation of application No. 11/689,915, filed on Mar. 22, 2007, now Pat. No. 7,447,510, which is a continuation-in-part of application No. 11/625,091, filed on Jan. 19, 2007.

(60) Provisional application No. 60/863,899, filed on Nov. 1, 2006, provisional application No. 60/862,453, filed on Oct. 22, 2006.

(51) Int. Cl.
*H04W 4/00* (2009.01)

(52) U.S. Cl.
USPC ............. 455/466; 455/412.1; 455/412.2; 455/414.1; 455/428; 709/206

(58) Field of Classification Search
USPC . 455/466, 412.1, 412.2, 414.1, 428; 379/206; 709/206
See application file for complete search history.

(56) References Cited

U.S. PATENT DOCUMENTS 4,654,793 A   3/1987   Elrod
4,774,618 A   9/1988   Raviv
(Continued)

FOREIGN PATENT DOCUMENTS

CN   1567936 A   1/2005
CN   1589046 A   3/2005
(Continued)

OTHER PUBLICATIONS

Communication pursuant to Article 94(3) of the EPC, EP Applicatoin 07118156.4, dated Oct. 9, 2009.
(Continued)

*Primary Examiner* — Nghi H Ly
(74) *Attorney, Agent, or Firm* — Novak Druce Connolly Bove + Quigg LLP

(57) ABSTRACT

An apparatus for use with communication devices, the communication devices being configured to send and receive SMS messages, the apparatus includes a memory configured to store information indicative of the communication devices that are configured to process an SMS message of a first type, a processor configured to receive an SMS message of the first type from a first communication device, wherein the received SMS message includes contact information related to a user of the first communication device, analyze the received SMS message to determine information indicative of a destination address of the SMS message, the destination address corresponding to a second communication device, determine whether the second communication device is configured to receive SMS messages of the first type using the information indicative of the destination address and the information stored in the memory, send an outgoing SMS message to the second communication device wherein the outgoing SMS message is of the first type if it is determined that the second communication device is configured to receive SMS messages of the first type, and the outgoing SMS message is of a second type if it is determined that the second communication device is not configured to receive SMS messages of the first type.

28 Claims, 24 Drawing Sheets

U.S. PATENT DOCUMENTS

| | | |
|---|---|---|
| 4,945,218 A | 7/1990 | Talbott |
| 5,483,052 A | 1/1996 | Smith, III et al. |
| 5,493,105 A | 2/1996 | Desai |
| 5,590,197 A | 12/1996 | Chen et al. |
| 5,604,640 A | 2/1997 | Zipf et al. |
| 5,612,524 A | 3/1997 | Sant'Anselmo et al. |
| 5,640,565 A | 6/1997 | Dickinson |
| 5,671,279 A | 9/1997 | Elgamal |
| 5,671,282 A | 9/1997 | Wolff et al. |
| 5,678,041 A | 10/1997 | Baker et al. |
| 5,689,654 A | 11/1997 | Kikinis et al. |
| 5,692,073 A | 11/1997 | Cass |
| 5,715,399 A | 2/1998 | Bezos |
| 5,732,229 A | 3/1998 | Dickinson |
| 5,740,549 A | 4/1998 | Reilly et al. |
| 5,774,117 A | 6/1998 | Kukkal et al. |
| 5,791,991 A | 8/1998 | Small |
| 5,793,972 A | 8/1998 | Shane |
| 5,794,219 A | 8/1998 | Brown |
| 5,794,232 A | 8/1998 | Mahlum et al. |
| 5,806,043 A | 9/1998 | Toader |
| 5,848,412 A | 12/1998 | Rowland et al. |
| 5,878,397 A | 3/1999 | Stille et al. |
| 5,987,136 A | 11/1999 | Schipper et al. |
| 6,092,133 A | 7/2000 | Erola et al. |
| 6,094,573 A | 7/2000 | Heinonen et al. |
| 6,115,711 A | 9/2000 | White |
| 6,149,263 A | 11/2000 | Nakano |
| 6,161,113 A | 12/2000 | Mora et al. |
| 6,161,124 A | 12/2000 | Takagawa et al. |
| 6,183,377 B1 | 2/2001 | Liang |
| 6,185,553 B1 | 2/2001 | Byrd et al. |
| 6,199,099 B1 | 3/2001 | Gershman et al. |
| 6,324,587 B1 | 11/2001 | Trenbeath et al. |
| 6,346,881 B1 | 2/2002 | Davidson |
| 6,356,905 B1 | 3/2002 | Gershman et al. |
| 6,374,259 B1 | 4/2002 | Celik |
| 6,433,795 B1 | 8/2002 | MacNaughton et al. |
| 6,459,904 B1 | 10/2002 | Lorello et al. |
| 6,564,261 B1 | 5/2003 | Gudjonsson et al. |
| 6,615,057 B1 | 9/2003 | Pettersson |
| 6,633,311 B1 | 10/2003 | Douvikas et al. |
| 6,654,768 B2 | 11/2003 | Celik |
| 6,694,353 B2 | 2/2004 | Sommerer |
| 6,810,405 B1 | 10/2004 | LaRue et al. |
| 6,859,650 B1 | 2/2005 | Ritter |
| 6,859,829 B1 | 2/2005 | Parupudi et al. |
| 6,868,451 B1 | 3/2005 | Peacock |
| 6,973,477 B1 | 12/2005 | Martino |
| 7,146,165 B2 | 12/2006 | Manner et al. |
| 7,222,147 B1 | 5/2007 | Black et al. |
| 7,225,244 B2 | 5/2007 | Reynolds et al. |
| 7,296,036 B2 | 11/2007 | Celik |
| 7,349,907 B2 | 3/2008 | Celik |
| 7,353,044 B2 | 4/2008 | Nachef |
| 7,447,510 B2 * | 11/2008 | Celik et al. ............ 455/466 |
| 7,509,349 B2 | 3/2009 | Celik |
| 7,567,542 B2 | 7/2009 | Rybak et al. |
| 7,769,366 B2 | 8/2010 | Celik |
| 7,769,367 B2 | 8/2010 | Celik |
| 7,769,368 B2 | 8/2010 | Celik |
| 7,881,736 B2 * | 2/2011 | Celik et al. ............ 455/466 |
| 2001/0020239 A1 | 9/2001 | Ukigawa et al. |
| 2001/0044321 A1 | 11/2001 | Ausems et al. |
| 2002/0138470 A1 | 9/2002 | Zhou |
| 2003/0009374 A1 | 1/2003 | Moodie et al. |
| 2003/0009385 A1 | 1/2003 | Tucciarone et al. |
| 2003/0022697 A1 | 1/2003 | Chen et al. |
| 2003/0073440 A1 | 4/2003 | Mukherjee et al. |
| 2003/0083078 A1 | 5/2003 | Allison et al. |
| 2003/0135586 A1 | 7/2003 | Minborg et al. |
| 2003/0163598 A1 | 8/2003 | Wilson et al. |
| 2003/0172138 A1 | 9/2003 | McCormack et al. |
| 2003/0236769 A1 | 12/2003 | Pyhalammi |
| 2004/0024846 A1 | 2/2004 | Randall et al. |
| 2004/0093317 A1 | 5/2004 | Swan |
| 2004/0128151 A1 | 7/2004 | Mock et al. |
| 2004/0199598 A1 | 10/2004 | Kalfas |
| 2004/0235503 A1 | 11/2004 | Koponen et al. |
| 2004/0242216 A1 | 12/2004 | Boutsikakis |
| 2004/0249846 A1 | 12/2004 | Randall et al. |
| 2005/0021571 A1 | 1/2005 | East |
| 2005/0047582 A1 | 3/2005 | Shaffer et al. |
| 2005/0059418 A1 | 3/2005 | Northcutt |
| 2005/0102328 A1 | 5/2005 | Ring et al. |
| 2005/0117523 A1 | 6/2005 | Parupudi et al. |
| 2005/0122909 A1 | 6/2005 | Parupudi et al. |
| 2005/0122910 A1 | 6/2005 | Parupudi et al. |
| 2005/0149487 A1 | 7/2005 | Celik |
| 2005/0208927 A1 | 9/2005 | Wong et al. |
| 2006/0031237 A1 | 2/2006 | DeAnna et al. |
| 2006/0041590 A1 | 2/2006 | King et al. |
| 2006/0089130 A1 | 4/2006 | Yamamura et al. |
| 2006/0101266 A1 | 5/2006 | Klassen et al. |
| 2006/0212482 A1 | 9/2006 | Celik |
| 2006/0235931 A1 | 10/2006 | Ruthe et al. |
| 2006/0290496 A1 | 12/2006 | Peeters |
| 2007/0021111 A1 | 1/2007 | Celik |
| 2007/0061420 A1 | 3/2007 | Basner |
| 2007/0181675 A1 | 8/2007 | Drummond et al. |
| 2008/0015998 A1 | 1/2008 | Celik |
| 2008/0032742 A1 | 2/2008 | Celik et al. |
| 2008/0090597 A1 | 4/2008 | Celik et al. |
| 2008/0130554 A1 | 6/2008 | Gisby et al. |
| 2008/0257952 A1 | 10/2008 | Zandonadi |
| 2008/0261577 A1 | 10/2008 | Celik et al. |
| 2009/0042590 A1 | 2/2009 | Celik et al. |
| 2009/0097633 A1 | 4/2009 | James, Jr. et al. |
| 2009/0119339 A1 | 5/2009 | Celik |
| 2009/0164519 A1 | 6/2009 | Vainio |
| 2009/0176485 A1 | 7/2009 | Michaels et al. |
| 2009/0221307 A1 | 9/2009 | Wolak et al. |
| 2009/0254572 A1 | 10/2009 | Redlich et al. |
| 2009/0327282 A1 | 12/2009 | Wittig et al. |

FOREIGN PATENT DOCUMENTS

| | | |
|---|---|---|
| EP | 1024674 A1 | 8/2000 |
| EP | 1189412 A2 | 3/2002 |
| EP | 1372327 A1 | 12/2003 |
| EP | 1677186 A1 | 7/2006 |
| GB | 2399255 A | 9/2004 |
| RU | 2246754 | 2/2005 |
| WO | 9701137 A1 | 1/1997 |
| WO | 9803923 A1 | 1/1998 |
| WO | 9806055 A1 | 2/1998 |
| WO | 9824036 A1 | 6/1998 |
| WO | 9929127 A1 | 6/1999 |
| WO | 0239300 A1 | 5/2002 |
| WO | 02098146 A2 | 12/2002 |
| WO | 03098409 A1 | 11/2003 |
| WO | 2004056140 A1 | 7/2004 |
| WO | 2006011995 A2 | 2/2006 |
| WO | 2006088627 A2 | 8/2006 |
| WO | 2007031708 A1 | 3/2007 |
| WO | 2007094823 A1 | 8/2007 |
| WO | 2008016553 A2 | 2/2008 |
| WO | 2008051276 A2 | 5/2008 |
| WO | 2008057349 A2 | 5/2008 |
| WO | 2008130653 A1 | 10/2008 |

OTHER PUBLICATIONS

Dawson et al., "vCard MIME Directory Profile; rfc2426.txt", IETF Standard, Internet Engineering Task Force, IETF, CH, pp. 1-42 (1998).

ETSI Standards, European Telecommunications Standards Institute, Sophia-Antipo, FR, "Digital cellular telecommunications system (Phase 2+); Universal Mobile Telecommunications System (UMTS); Technical realization of Short Message Service (SMS) (3GPP TS 23.040 version 6.6.0 Release 6); ETSI TS 123 040", 3-T2(V660):1-192 (2005).

ETSI Standards, European Telecommunications Standards Institute, Sophia-Antipo, FR, "Smart cards; ETSI numbering system for telecommunication application providers (Release 7); ETSI TS 101 220", SCP-WG1(V740):1-27 (2006).

George Kambourakis et al., "Delivering Attribute Certificates over GPRS", 2004, ACM, NY, NY, pp. 1166-1170.

Howes et al., "A MIME Content-Type for Directory Information; rfc2425.txt", IETF Standard, Internet Engineering Task Force, IETF, CH, pp. 1-33 (1998).

Ulrike Meyer et al., "A man-in-the-middle attack on UMTS", 2004, ACM, NY, NY, pp. 90-97.

Versit Consortium, "vCard—The Electronic Business Card—Version 2.1—Specifications", Internet citation, [Online] Sep. 18, 1996, XP002318282, retrieved from Internet: URL:http://www.imc.org/pdi/vacrd-21.doc> [retrieved on Feb. 18, 2005], pp. 1-40.

International Search Report, PCT/US06/38589, mailed Apr. 30, 2007.

International Search Report, PCT/US2006/009262, mailed Mar. 31, 2009.

* cited by examiner

*A welcome message is displayed:*
Setup your profile once, and exchange it with friends after phone calls.

*Instructions message is displayed:*
Please enter your contact information.

First Name:
[Jane (*enter subscriber name*)]

Last Name:
Doe(*enter subscriber name*)]

Mobile Number:
[+15088368810 (*enter/change mobile number*)]

Home Number:
[+15088368811 (*enter home number or leave blank*)]

Work Number:
[+15088368812 (*enter work number or leave blank*)]

Add Email?
[Personal, Business, None]
If Personal or Business,then:
Email:
[jane.doe@domain.com].

*A setup confirmation message is displayed:*
My Profile setup is completed.

Fig. 2

SHORT MESSAGE SERVICE NETWORK PLUG-IN

CROSS-REFERENCE TO RELATED ACTIONS

Each of the following:
U.S. Provisional Application 60/862,453, filed Oct. 22, 2006;
U.S. Provisional Application 60/863,899, filed Nov. 1, 2006;
U.S. application Ser. No. 11/625,091, filed Jan. 19, 2007;
U.S. application Ser. No. 11/540,820, filed Sep. 28, 2006;
U.S. application Ser. No. 11/353,452, filed Feb. 13, 2006;
U.S. application Ser. No. 11/056,022, filed Feb. 11, 2005;
U.S. application Ser. No. 10/879,331, filed Jun. 29, 2004;
U.S. application Ser. No. 10/657,757, filed Sep. 8, 2003;
U.S. Pat. No. 6,374,259, filed Dec. 30, 1998; and
U.S. Application No. 60/102,614, filed Oct. 1, 1998;
is incorporated by reference herein to the extent that it is not inconsistent with the present application. This application is a continuation of U.S. Non-Provisional application Ser. No. 12/253,739, filed on Oct. 17, 2008 now U.S. Pat. No. 7,881,736, which is a continuation of Non-Provisional application Ser. No. 11/689,915, filed Mar. 22, 2007 now U.S. Pat. No. 7,447,510, which is a continuation-in-part of U.S. Non-Provisional application Ser. No. 11/625,091, filed Jan. 19, 2007, which claims priority to U.S. Provisional Application No. 60/861,899, filed Nov. 1, 2006, and U.S. Provisional Application No. 60/862,453, filed Oct. 22, 2006, each of which are incorporated by reference herein in their entirety. Furthermore, U.S. application Ser. No. 11/689,915 is incorporated by reference herein in its entirety.

BACKGROUND

A phonebook of a mobile device typically plays a significant role in mobile communications. The phone book is typically a source of contact information for device calls, text messages, faxes, instant messages, and e-mails. One challenge in the mobile device market is inserting, updating, and maintaining contact information stored in the phonebook. A user typically manually enters another person's contact information into the user's mobile device. This takes time, is often difficult with small buttons and small screens on mobile devices, and can be prone to errors with manual data entry. Often, the result is that many individuals do not enter contact information into their mobile phonebooks.

SUMMARY

In general, in an aspect, embodiments herein provide an apparatus for use with communication devices, the communication devices being configured to send and receive short message service (SMS) messages, the apparatus includes a memory configured to store information indicative of the communication devices that are configured to process an SMS message of a first type, a processor configured to receive an SMS message of the first type from a first communication device, wherein the received SMS message includes contact information related to a user of the first communication device, analyze the received SMS message to determine information indicative of a destination address of the SMS message, the destination address corresponding to a second communication device, determine whether the second communication device is configured to receive SMS messages of the first type using the information indicative of the destination address and the information stored in the memory, send an outgoing SMS message to the second communication device wherein the outgoing SMS message is of the first type if it is determined that the second communication device is configured to receive SMS messages of the first type, and the outgoing SMS message is of a second type if it is determined that the second communication device is not configured to receive SMS messages of the first type.

Implementations of the embodiments may provide one or more of the following features. The processor is configured to generate the outgoing SMS message using the contact information related to the user of the first communication device. The outgoing SMS message includes information indicative of the contact information related to the user of the first communication device. The SMS message of the first type is a formatted binary SMS message. The information indicative of the contact information related to the first user is formatted in a tag-length-value format. The SMS message of the second type is an unformatted text SMS message. The SMS message of the second type is a vCard SMS message. The outgoing message is a forward-a-contact message. The information indicative of the contact information related to the first user is formatted using multiple text strings arranged in a predetermined format such that the second communication device can identify a characteristic related to the information indicative of the contact information related to the first user. The processor is configured to process initialization requests from the first communication device. The processor is configured to parse a type allocation code from the initialization request and to determine an operation mode of the first communication device using the type allocation code and the information stored in the memory. The processor is configured to prepare an initialization response that includes information indicative of the operation mode and to send the initialization response to the first communication device. The processor is configured to process a statistical SMS message including statistical information indicative of usage characteristics of the apparatus. The processor is configured to parse the information included in the statistical SMS message and to store the information in the memory.

In general, in another aspect, an embodiment provides a computer program product residing on a computer readable medium and comprising computer readable instructions configured to cause a computer to access a memory storing information indicative of communication devices that are configured to process an SMS message of a first type, receive an SMS message of the first type from a first communication device, wherein the received SMS message includes contact information related to a user of the first communication device, analyze the received SMS message to determine information indicative of a destination address of the SMS message, the destination address corresponding to a second communication device, determine whether the second communication device is configured to receive SMS messages of the first type using the information indicative of the destination address and the information stored in the memory, send an outgoing SMS message to the second communication device wherein the outgoing SMS message is of the first type if it is determined that the second communication device is configured to receive SMS messages of the first type, and the outgoing SMS message is of a second type if it is determined that the second communication device is not configured to receive SMS messages of the first type.

Implementations of the embodiments may provide one or more of the following features. The computer readable instructions are further configured to cause the computer to generate the outgoing SMS using the contact information related to the user of the first communication device. The computer readable instructions are further configured to cause the computer to include information indicative of the contact information related to the user of the first communication device in the outgoing SMS. The computer readable instructions are further configured to cause the computer to generate a formatted binary SMS message as the SMS message of the first type. The computer readable instructions are further configured to cause the computer to format the information indicative of the contact information related to the user of the first communication device in a tag-length-value format. The computer readable instructions are further configured to cause the computer to generate an unformatted text SMS message as the SMS message of the second type. The computer readable instructions are further configured to cause the computer to format the information indicative of the contact information related to the user of the first communication device using a plurality of text stings arranged in a predetermined format such that the second communication device can identify a characteristic related to the information related to the information indicative of the contact information related to the first user.

Implementations of the embodiments may further provide one or more of the following features. The computer readable instructions are further configured to cause the computer to generate a vCard as the SMS message of the second type. The computer readable instructions are further configured to cause the computer to generate a forward-a-contact message as the outgoing SMS message. The computer readable instructions are further configured to cause the computer to process initialization requests from the first communication device. The computer readable instructions are further configured to cause the computer to parse a type allocation code from the initialization request and to determine an operation mode of the first communication device using the type allocation code and the information stored in the memory. The computer readable instructions are further configured to cause the computer to prepare an initialization response that includes information indicative of the operation mode and to send the initialization response to the first communication device. The computer readable instructions are further configured to cause the computer to process a statistical SMS message including information indicative of usage characteristics of the computer. The computer readable instructions are further configured to cause the computer to parse the information included in the statistical SMS message and to store the information in the memory.

In general, in another aspect, embodiments may provide a method for use with communication devices, the communication devices being configured to send and receive SMS messages, the method including accessing a memory configured to store information indicative of communication devices that are configured to receive an SMS message of a first type, receiving an SMS message of the first type from a first communication device, wherein the received SMS message includes contact information related to a user of the first communication device, analyzing the received SMS message to determine information indicative of a destination address of the SMS message, the destination address corresponding to a second communication device, determining if the second communication device is configured to receive SMS messages of the first type using the information indicative of the destination address and the information stored in the memory, sending an outgoing SMS message to the second communication device wherein the outgoing SMS message is of the first type if it is determined that the second communication device is configured to receive SMS messages of the first type, and the outgoing SMS message is of a second type if it is determined that the second communication device is not configured to receive SMS messages of the first type.

Implementations of the embodiments may provide one or more of the following features. Sending the outgoing SMS message includes generating the outgoing SMS message using the contact information related to the first user of the first communication device. Sending the outgoing SMS message includes sending information indicative of the contact information indicative of the contact information related to the user of the first communication device. Generating the SMS message of the first type includes generating a formatted binary SMS message. The information indicative of the contact information related to the first user is formatted in a tag-length-value format. Generating the SMS message of the second type includes generating an unformatted text SMS message. The information indicative of the contact information related to the first user is formatted using a plurality of text strings arranged in a predetermined format such that the second communication device can identify a characteristic related to the information indicative of the contact information related to the first user.

Implementations of the embodiments may further provide one or more of the following features. Generating the SMS message of the second type includes generating an SMS message that includes information indicative of a vCard. Sending the outgoing SMS message includes generating a forward-a-contact message. The method further includes processing initialization requests from the first communication device. The method further includes parsing a type allocation code from the initialization request and determining an operation mode of the first communication device using the type allocation code and the information stored in the memory. The method further includes preparing an initialization response that includes information indicative of the operation mode and sending the initialization response to the first communication device. The method further includes processing a statistical SMS message including information indicative of usage characteristics of the communication devices. The method further includes parsing the information included in the statistical SMS message and storing the information in the memory.

Various aspects of the invention may provide one or more of the following capabilities. Embodiments of the invention can provide systems, methods, and communication enhancements to automatically transfer (e.g., send, insert, and exchange) a caller's contact information into a user's phonebook using Short Message Service (SMS) messages. A network plug-in can be configured to work with existing cellular communication networks. A network plug-in can automatically determine whether a communication device is configured to send specific types of SMS messages. A network plug-in can automatically set an operation mode of a communication device. A network plug-in can automatically determine whether a communication device can receive a specific type of SMS message. A network plug-in can convert from one SMS message type to another. The network plug-in can determine when it is desired to convert a format of an SMS message received from a first communication device prior to sending it to a second communication device. The network plug-in can receive and process initialization requests from communication devices. The network plug-in can receive and process SMS messages containing statistics.

These and other capabilities of the invention, along with the invention itself, will be more fully understood after a review of the following figures, detailed description, and claims.

BRIEF DESCRIPTION OF THE FIGURES

FIG. 5 is a diagram of SMS messages being sent from a communication device to a network plug-in.

DETAILED DESCRIPTION

Embodiments of the invention provide techniques for sharing contact information between users of mobile communications devices. Specifically, a mobile communication device prompts a first user to provide the first user's contact information to a second user's mobile device. If the first user elects to provide contact information to the second user, the first user's communication device generates a short-message-service (SMS) message and sends the SMS message to a service provider. The service provider analyzes the SMS message, including the destination address of the second user's communication device, to determine if the second user's communication device has the appropriate software and/or configuration to receive formatted SMS messages. If the second user's communication device is configured to receive formatted SMS messages that include contact information, the service provider sends a formatted SMS message to the second device including the first user's contact information. If the second communication device is not configured to receive formatted SMS messages, then the service provider sends an unformatted SMS message to the second user's communication device that includes the first user's contact information. Other embodiments are within the scope of the invention.

Figure 1:
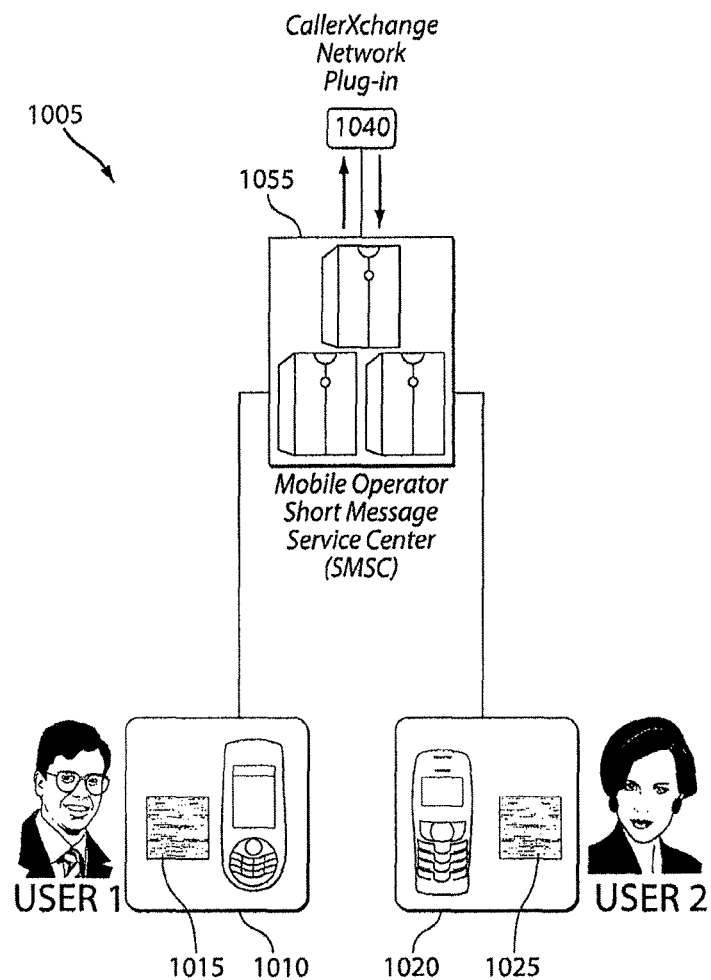
FIG. 1 is a schematic of a communication system including communication devices.

Referring to FIG. 1, a system 1005 includes communication devices 1010 and 1020, a CallerXchange network plug-in 1040, and a service provider 1055. The communication devices 1010 and 1020 are portable communication devices such as a cell-phone, a Blackberry®, a personal digital assistant (PDA), a personal computer, a cordless land-line based phone, etc., although other communication devices can be used with the system 1000. The communication devices 1010 and 1020 are configured to provide communication service via, for example, a mobile phone service provided by the mobile operator (e.g., using a terrestrial cellular communication network, a satellite-based communication network, a Universal Mobile Telecommunications System (UMTS), a Global System for Mobile Communications (GSM) system, a code division multiple access (CDMA) system, a time division multiple access (TDMA) system, etc.). While two of the communication devices 1010 and 1020 are shown, other quantities of communication devices are possible. The communication devices 1010 and 1020 are configured to include Universal Subscriber Identity Modules ((U)SIMs) and/or device phonebooks that are configured to receive and store information.

Each of the communication devices preferably includes an International Mobile Equipment Identity (IMEI). The IMEI number is typically a unique number that is associated with certain types of the communication devices (e.g., GSM and UMTS devices). The IMEI number includes information that is indicative of the origin, model, and serial number of the communication device. One portion of the IMEI number is the type allocation code (TAC) value. The TAC value is typically an 8-digit portion of the IMEI code that is indicative of the origin and model of the communication device. While the present application described using the IMEI number to perform certain functions, other identification conventions can be used.

The communication devices 1010 and 1020 include CallerXchange application modules 1015 and 1025, respectively. The application modules 1015 and 1025 are included in the (U)SIM of the communication devices 1010 and 1020, respectively, although other configurations are possible (e.g., the applications modules 1015 and 1025 can be located on an operating system of the communication devices 1010 and 1020 and/or be hosted on a remote server). The application modules 1015 and 1025 are configured to provide for automatic exchange and/or storage of users' contact information (as described more fully below). The service provider 1055 is configured to provide SMS service to the communication devices 1010 and 1020 (e.g., by providing store-and-forward service). The service provider 1055 can be, for example, a mobile operator short message service center (SMSC).

While the following discussion focuses on the operation of the communication device 1010, the operation of other communication devices is preferably similar. Furthermore, while the following discussion uses the communication device 1010 as a point of reference (e.g., the communication device 1010 initiates a transaction), other communication devices can be used as a point of reference in a similar manner.

The communication device 1010 is configured to prompt users of the communication device 10 to provide contact information (e.g., work telephone number(s), home telephone number(s), fax number(s), e-mail addresses(s), etc.) for storage in the communication device 10, or elsewhere. The communication device 1010 is configured to prompt a user to provide contact information during an initial setup phase (e.g., shortly after purchasing the communication device 10), although the user can be prompted to provide information at other times (e.g., at predetermined intervals). The communication device 1010 is configured to store the user's contact information, for example, within the (U)SIM of the communication device 1010, and/or remotely (e.g., on the communication system and/or within a remote server). The communication device 1010 is configured to prompt the user to categorize the contact information provided by the user of the communication device 1010. For example, the user can be prompted to categorize individual pieces of contact information as being personal, work, primary, secondary, traveling, etc.

Figure 3A:
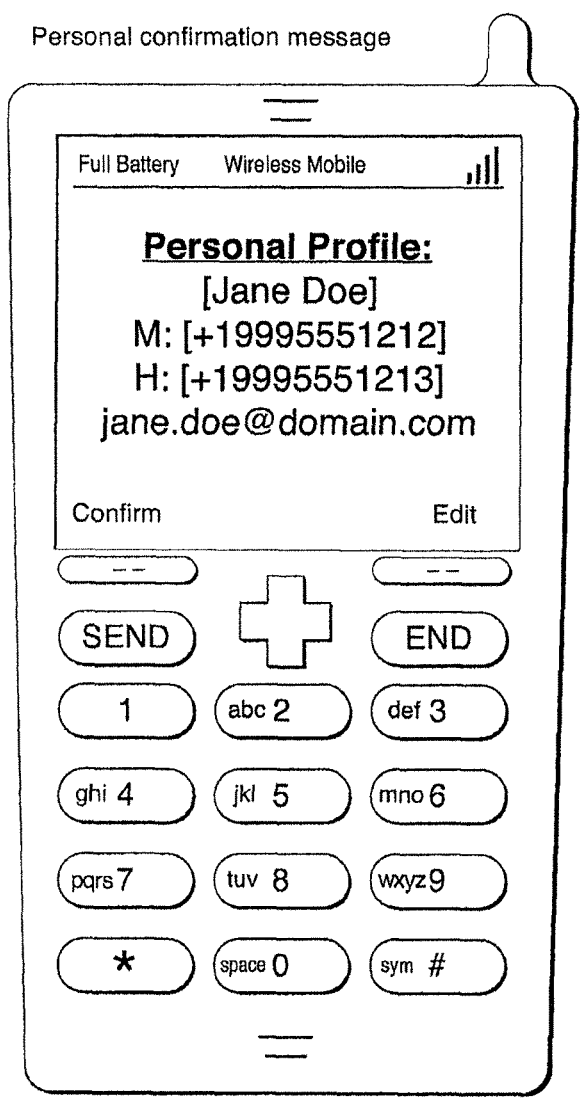
FIGS. 3a-3b are diagrams of a profile confirmation message.
Figure 3B:
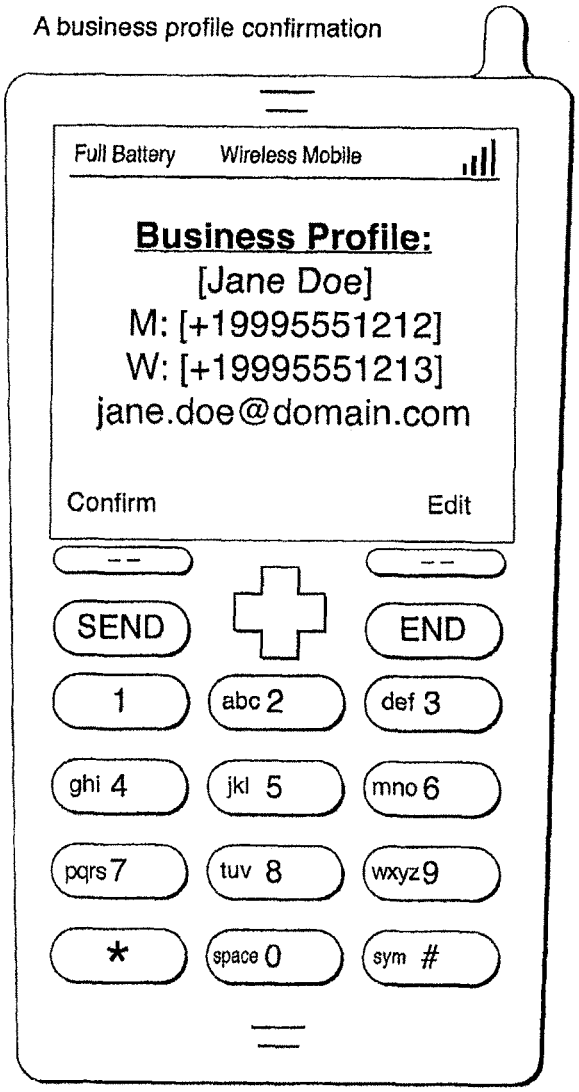
Figures 1, 16:
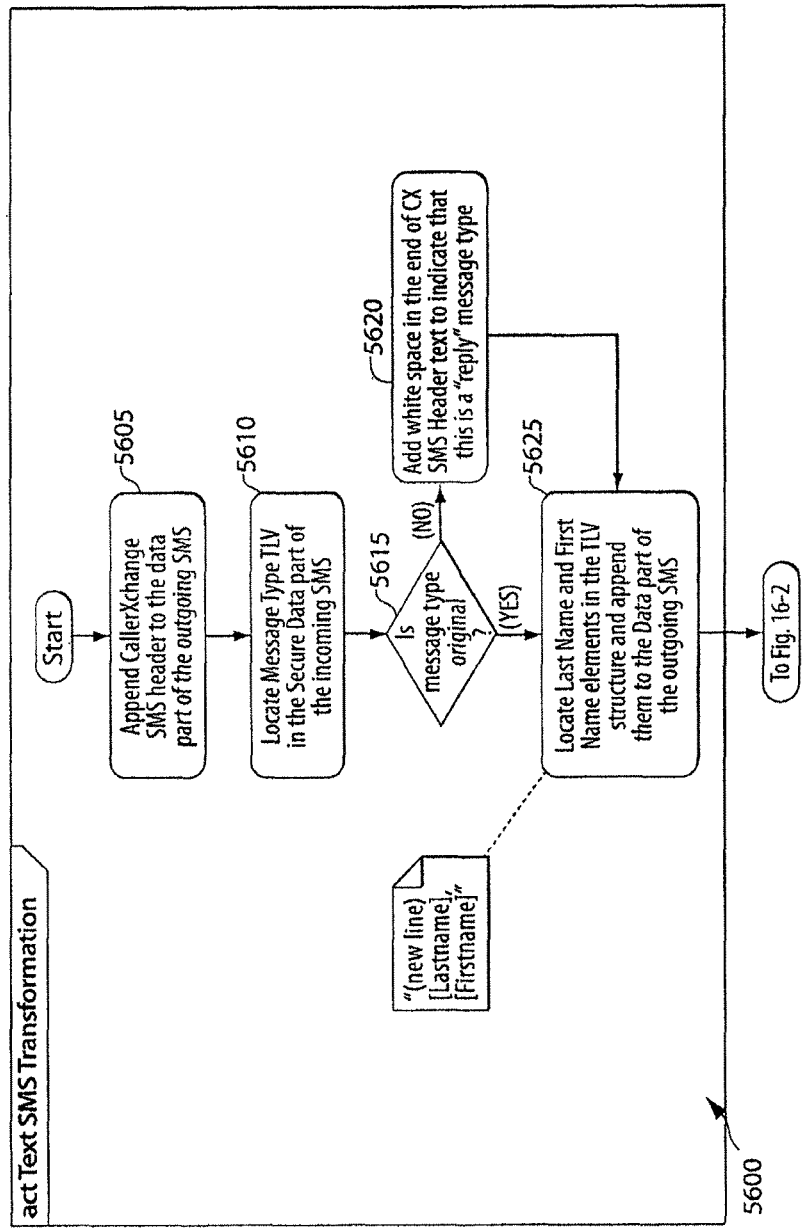
FIG. 16 is a block flow diagram of a process for SMS message transformation.
Figures 2, 16:
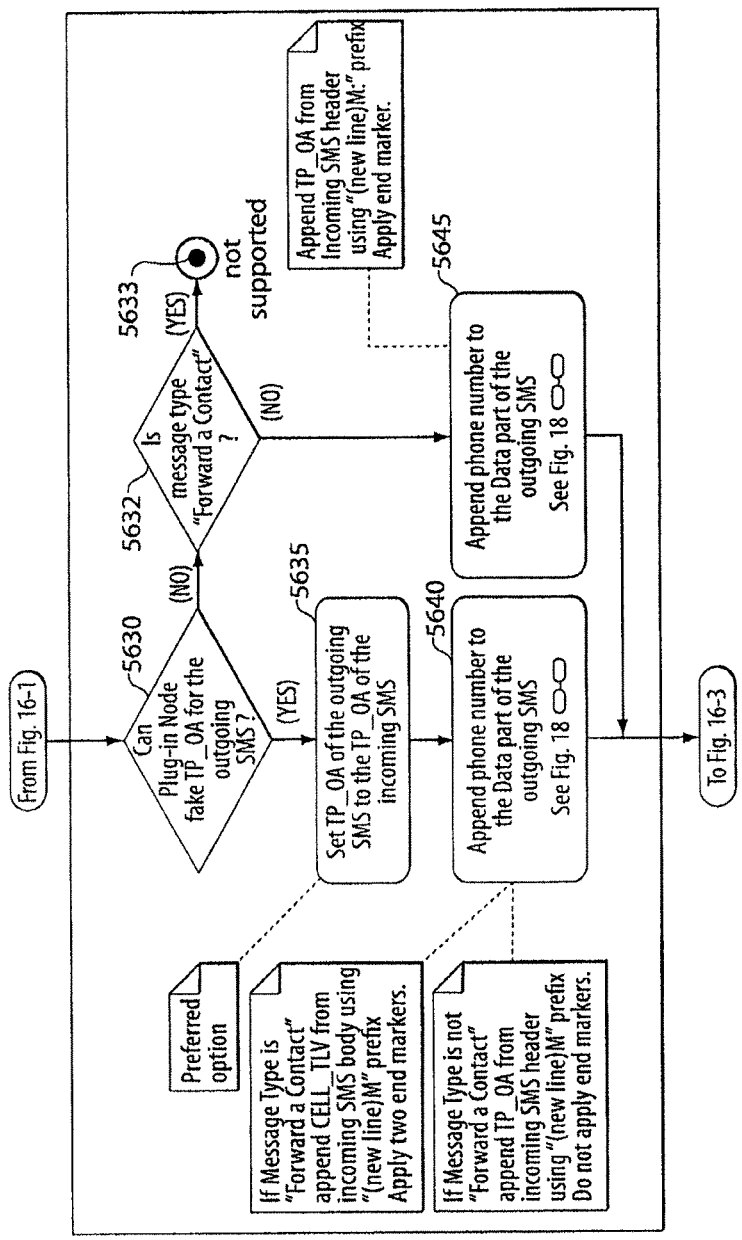
FIG. 2 is a profile setup dialog.

Referring to FIG. 2, a profile initialization sequence is shown. The profile setup process is preferably a linear process, and is preferably invoked after every startup of the device, until the setup process is complete, although the setup process can be invoked at other times. During the setup process, the application module 1015 is configured to prompt the user to input the following information: FirstName: [Jane (enter user name)], LastName: [Doe (enter user name)], MobileNumber: [+19995551212 (enter/change MobileNumber)], HomeNumber: [+19995551213 (enter HomeNumber or leave blank)], WorkNumber: [+19995551214 (enter WorkNumber or leave blank)] and Email: [jane.doe@domain.com]. The application module 1015 can be configured such that some of the fields are mandatory. The application module 1015 can be configured to prompt the user to provide additional information (e.g., assistant information, spouse information, etc.). Referring also to FIGS. 3a and 3b, once the profile initialization is complete, the information contained therein is preferably displayed for confirmation. For example, the personal profile is preferably displayed as Personal Profile: [Jane Doe], M: [+19995551212], H: [+19995551213] and jane.doe@domain.com, and the business profile as Business Profile: [Jane Doe], M: [+19995551212], W: [+19995551214] and jane.doe@domain.com.

The application modules 1015 and 1025 are configured to provide for automatic transmission, reception, and/or storage of user information between users of the communication devices 1010 and 1020. For example, the application module 1015 is configured to, at predetermined times (e.g., upon completion of a call between the communication devices 1010 and 1020), automatically prompt the user of the communication device 1010 to provide the user of the communication device 1020 with the contact information of the user of the communication device 1010. The application module 1015 is configured to prompt the user of the communication device 1010 to choose some or all of the stored contact information to send to the user of the communication device 1020 (e.g., the user of the communication device 1010 can choose only to provide "work information" to the user of the communication device 1020). The application module 1025 is configured to cause the communication devices 1020 to automatically receive the user's (of the communication device 1010) contact information and to automatically prompt the user of the communication device 1020 to store the received contact information into the (U)SIM and/or device phonebook of the communication device 1020 after a communication event has concluded. The application modules 1015 and 1025 are configured to provide information to other communication devices using SMS messaging, although other information transfer methods can be used such as TCP/IP. If the application module 1025 is not enabled on the communication device 1025, the communication device 1025 preferably receives information from the communication device 1010 as an unformatted text SMS message in an inbox with the sending user's contact information.

The application module 1015 is configured to send different types of SMS messages depending on the capabilities of the communication device 1020. For example, the application module 1015 is configured to send either an unformatted text SMS message, a formatted binary SMS message, and/or vCard that includes the contact information associated with the communication device 1010. Preferably a default of the application module 1015 is to send a formatted SMS message (e.g., as described below) to the service provider 1055. The service provider 1055 is configured to determine if the SMS message should be sent to the network plug-in where the SMS message can be counted and converted, if desired, to either a formatted binary SMS message, an unformatted text SMS message, or a vCard, depending on, for example, if the communication device 1020 includes the application module 1025 or not, and if the application module 1025 is in an active operation mode. The unformatted text SMS messages and the formatted SMS messages are preferably similar to those described in U.S. patent application Ser. No. 11/625,091, although other configurations are possible.

Figure 4:
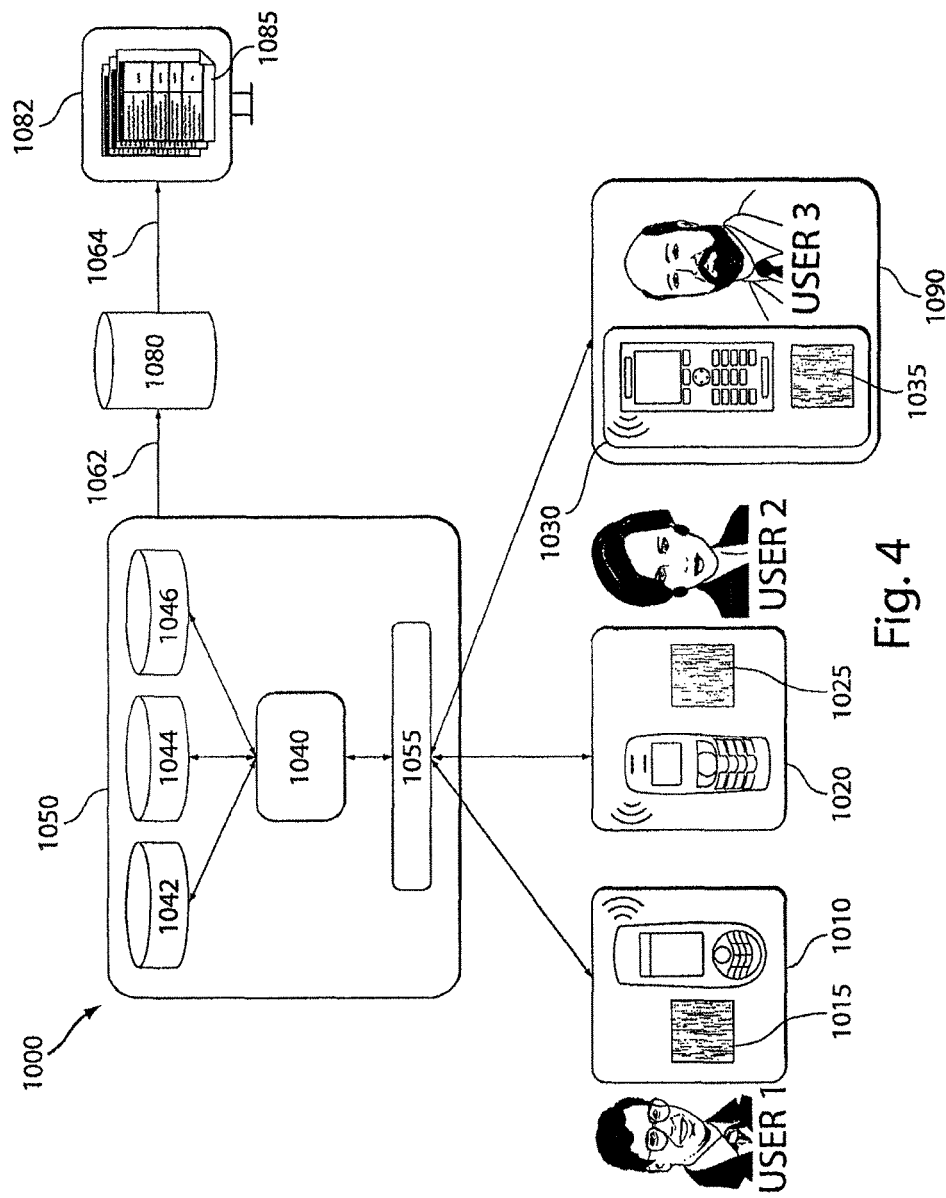
FIG. 4 is a schematic of a communication system including communication devices.

Referring to FIG. 4, a mobile contact management information system 1000 includes the communication devices 1010 and 1020, a communication device 1030, a mobile operator network 1050, a MobileStats repository 1080, a display 1082, and a mobile operator network 1090. The contact management information system 1000 is, for example, a UMTS Mobile Operator Network. The system 1000, however, can also be another type of mobile network, such as WCDMA (GSM), CDMA, CDMA2000, next generation phone system, etc. The communication devices 1010, 1020, and 1030 include application modules 1015, 1025, and 1035, respectively. The application modules 1015, 1025 and 1035 can be located, for example, on an operating system of the communication devices 1010, 1020 and 1030, respectively, or can be located within the (U)SIM card of the communication devices 1010, 1020 and 1030, respectively. The application modules 1015, 1025, and 1035 are configured to communicate with the network plug-in 1040 via SMS messages. The communication device 1030 is configured to operate on the network 1090 which is, for example, an outside mobile service provider's network, although other configurations are possible. The network 1050 is configured to communicate with the repository 1080 via a secure data transfer link 1062, which is, for example, a secure network connection. The repository 1080 can be located in a location remote from the network 1050. The repository 1080 is coupled to the display 1082 via a secure data transfer link 1064, which is, for example, a secure network connection. The display 1082 is configured to display MobileStats reports 1085 generated using information stored in the repository 1080.

The network 1050 includes the network plug-in 1040, a blacklist database 1042, a mobile station international subscriber directory number (MSISDN) database 1044, a statistics storage 1046, and the service provider 1055. The network plug-in 1040, the blacklist database 1042, the MSISDN database 1044, and the statistics storage 1046 are coupled together via, for example, a network connection. The network plug-in 1040 and the service provider 1055 are configured to communicate using a short message peer-to-peer (SMPP) protocol and/or short message application part (SMAP) via a network such as the Internet or a private TCP/IP network, although other protocols and/or physical layers can be used. The blacklist database 1042 is configured to store information indicative of devices that do not comply with a desired mobile network standard (e.g., communication devices that do not accept formatted SMS messages and/or do not support SIM Toolkit (STK) standards). Preferably, the blacklist database 1042 is populated prior to deployment of the network plug-in

1040. The statistics storage 1046 is configured to communicate with the repository 1080 using the secure data transfer link 1062.

The system 1000 can be configured to generate a MobileStats report 1085 on the display 1082. The system 1000 can be configured such that the MobileStats report 1085 is generated at predetermined times (e.g., once a week), or at the request of an external user. The MobileStats report 1085 can include various pieces of information. For example, the MobileStats report 1085 can include statistics such as the number of times a user sent, inserted, and/or updated their profile, the number of times the user declined a "send now" and/or "insert profile" prompt, the number of SMS's sent including a personal profile, the number of SMS's sent including a business profile, the percentage of time users sent information, the number of contact information fields sent within an SMS. The system 1000 can also be configured to track additional statistics/usage characteristics such as:

Number of Send my profile questions
Number of Send Update questions
Number of my profile SMS messages sent
Number of my profile SMS Update messages sent
Number of my profile SMS messages received
Number of entries contacts added to the phonebook
Number of additional number added to the phonebook
Number of e-mails added to the phonebook
Number of add questions accepted by user
Number of contacts updated in the phonebook
Number of entries updated in the phonebook
Number of additional numbers updated in the phonebook
Number of update questions accepted by user
Base phonebook size (e.g., total number of entries stored prior to CallerXchange being run the first time)
Base phonebook additional number count (e.g., total number of additional phone numbers stored prior to application being run the first time)
Base phonebook e-mails count (e.g., total number of emails stored prior to application being run the first time)
Base phonebook size (e.g., total number of entries stored prior to application installation)
Phonebook size (e.g., total number of contacts currently stored)
Phonebook additional number count
Phonebook e-mail count
Number of phonebook records created
Number of phonebook records updated
Application status
Send: Enabled/Disabled
Receive: Enabled/Disabled
TAC of handset (e.g., 4 bytes)
Application Operation Mode
Receive/Send
Send/Receive
Application version
Activation date and time
Number of times contact forwarded (e.g., the number of times a contact within the phonebook is forwarded using the Forward-A-Contact function)
Number of times a contact added to the phonebook via the application is called—counter preferably increments after any call to the number is placed (even if call does not "connect")
Number of times a contact added to the phonebook via application is sent an SMS—Counter preferably increments after an SMS is sent to a number in the phonebook added via CallerXchange.
Other information and usage traits can be tracked as well.

The network plug-in 1040 can be configured to automatically collect MobileStats information. For example, the application modules 1015, 1025, and 5115 are configured to collect the desired information used to generate the MobileStats report 1085. The application modules 1015, 1025, and 5115 are configured store the collected information on the (U)SIM card of each respective communication device, although other storage locations are possible. The network plug-in 1040 is configured to request information (e.g., the phone numbers of users connected to the network 1050) from the MSISDN database 1044. The network plug-in 1040 is configured to conduct an SMS campaign by sending a request for the desired MobileStats information to each of the application modules connected to the network 1050. The application modules are each configured to prepare an SMS message (e.g., the MobileStats SMS message discussed below) that contains the desired statistics, and to send the SMS message to the network plug-in 1040. The network plug-in 1040 is configured to parse the received MobileStats information and to send the collected statistics to the MSISDN database 1044 for storage. The network plug-in 1040 can be configured to automatically repeat the MobileStats collection process as desired.

Figure 5:
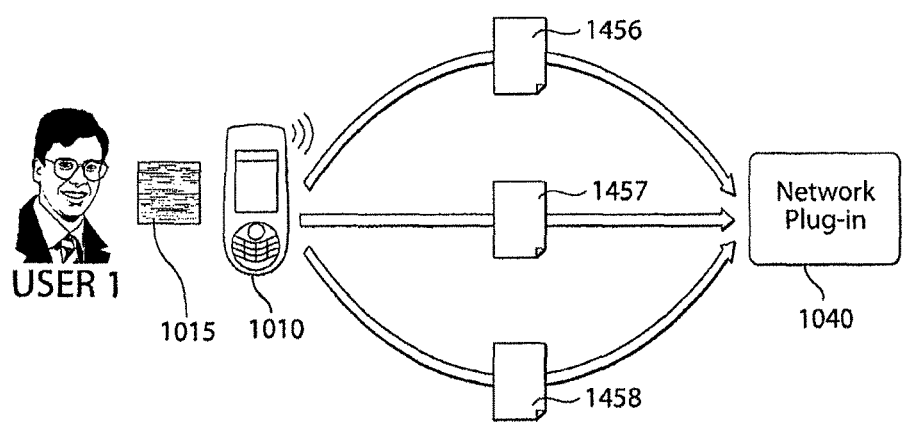

Referring also to FIG. 5, exemplary types of SMS messages between the application module 1015 and network plug-in 1040 are shown. For example, there are preferably multiple types of SMS messages from the application module 1015 to the network plug-in 1040. First, the application module 1015 is configured to register the MSISDN of the communication device 1010 with the network plug-in 1040 (e.g., in the database 1044) by sending a provisioning SMS message 1456 to the network plug-in 1040, e.g., once the application module 1015 starts properly. Preferably, the provisioning request is a formatted SMS message. The network plug-in 1040 is configured to check if the communication device 1010 conforms to standards used by the network 1050 using the provisioning request message 1456. Second, the application module 1015 is configured to send contact information associated with the communication device 1010 to other users using a contact information SMS message 1457. Third, the application module 1015 is configured to send usage statistics collected by the application module 1015 via a MobileStats SMS message 1458.

Referring to FIGS. 6-9, exemplary SMS message information packets are shown. SMS messages are preferably comprised of a Transmission Protocol-Data Unit (TP-DU) which contains the SMS message header and the Transmission Protocol-User Data (TP-UD). Referring also to FIG. 4, when the application module 1015 sends an SMS message to the application module 1025, an SMS—Submit is created and sent to the service provider 1055. The service provider 1055 is configured to receive the SMS—Submit and to convert it into an SMS—Deliver message. Preferably, at least a portion of the SMS message header of the SMS—Submit and SMS—Deliver messages are different, though other configurations are possible. The SMS—Submit messages and the SMS—Deliver messages can be in the form of, for example, unformatted text SMS messages and/or formatted binary SMS messages.

Figure 6:
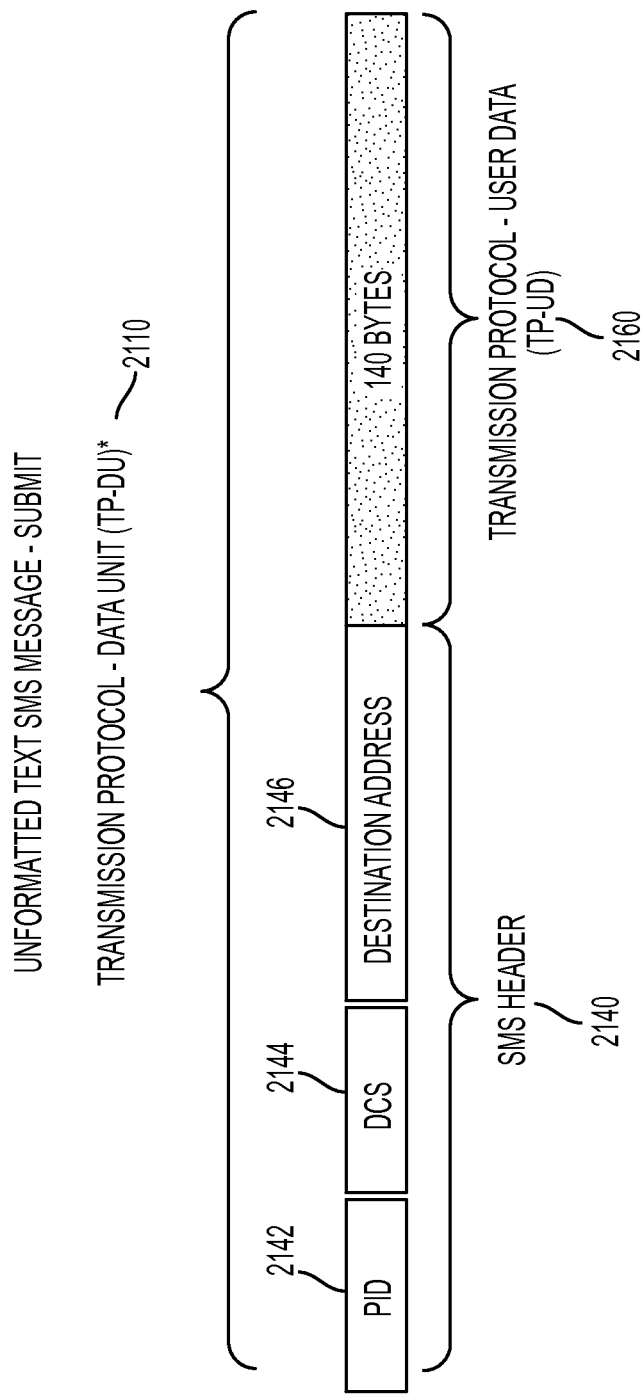
FIG. 6 is a diagram of a portion of an information packet.
Figure 17:
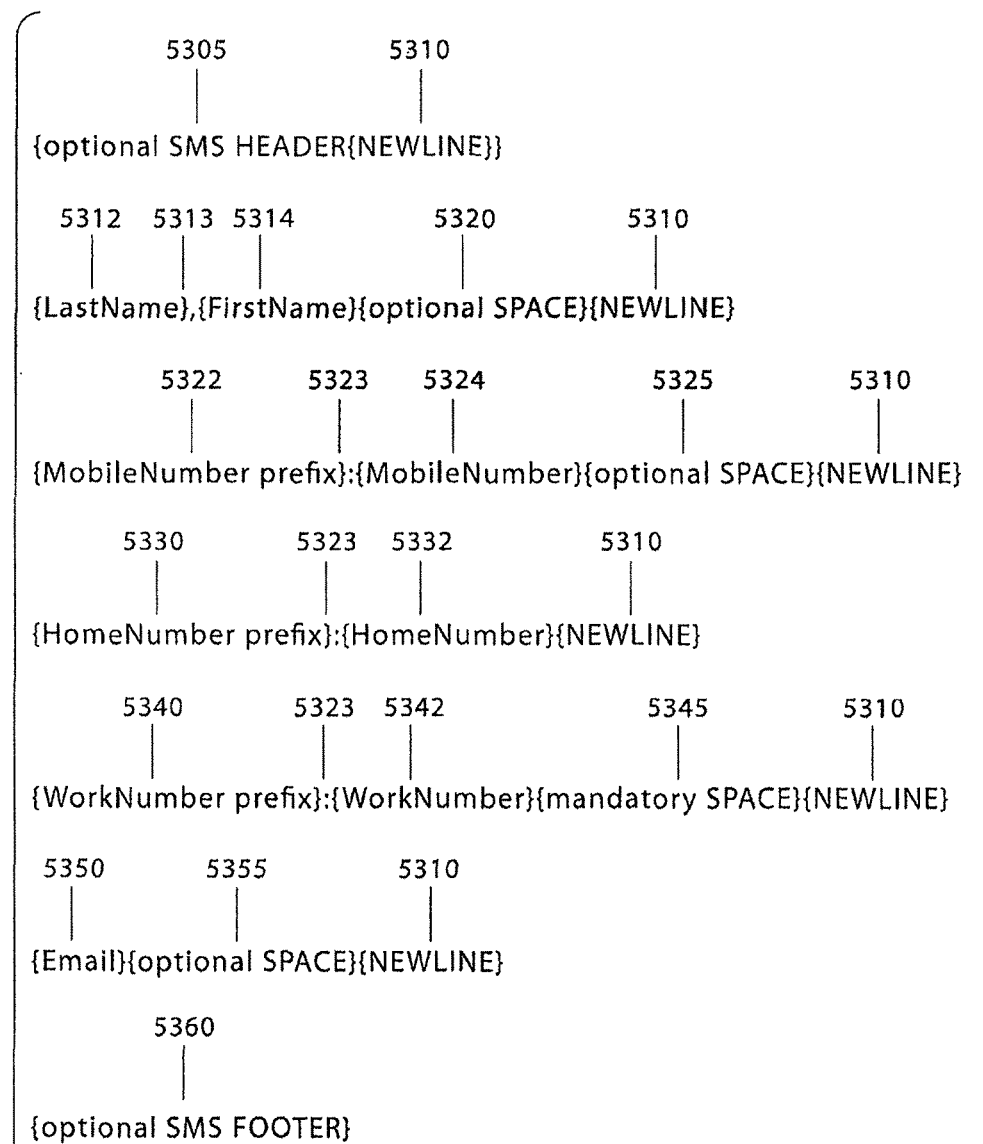
FIG. 17 is a table of information contained in a sub-portion of the information packets shown in FIGS. 6-7.

Referring to FIG. 6, an unformatted text SMS message—Submit TP-DU 2110 includes, inter alia, an SMS—Submit header 2140, and a TP-UD 2160. The SMS—Submit header 2140 is configured to include a Protocol Identifier (PID) value 2142, a Data Coding Scheme (DCS) value 2144, and a destination address 2146. The TP-UD 2160 is configured to store the content of the SMS message. For example, the TP-UD 2160 is configured to contain up to 140 bytes. The PID value 2142 preferably serves as an indicator of the type of message being sent. Preferably, 0x00, serves as the default value for the text SMS messages. For example, if the sending device sets the PID value to 0x00, the receiving device can be configured to detect that this is a text SMS message. The DCS value 2144 preferably indicates the designation of the SMS message. For example, setting the DCS value 2144 to 0x12 (7-bit SMS alphabet (U)SIM-specific message) indicates that the SMS message's designation is the (U)SIM. If the DCS value is not equal to 0x12, then the receiving communication device is configured store the text SMS message elsewhere (e.g., in an EFSMS elementary file). The application module 1015 can be configured to assemble the TP-UD 2160 (e.g., as shown in FIG. 17 and described in U.S. application Ser. No. 11/625,091).

Figure 7:
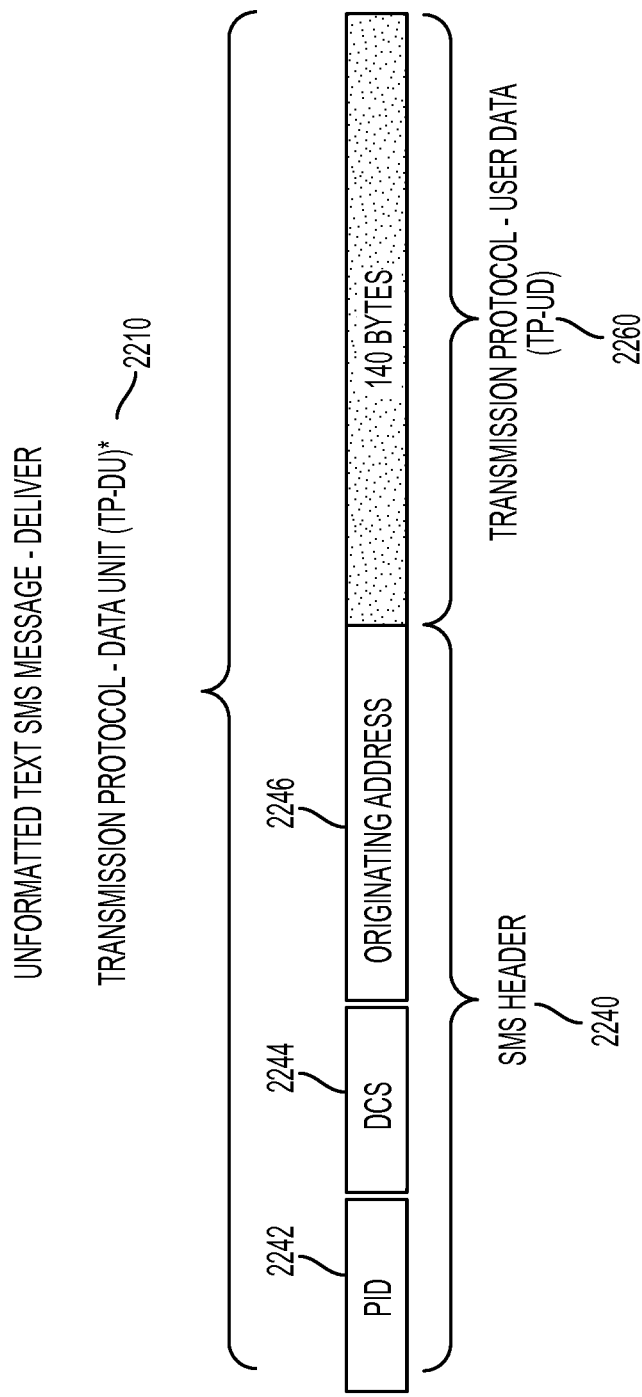
FIG. 7 is a diagram of a portion of an information packet.

Referring to FIG. 7, an unformatted text SMS—Deliver message TP-DU 2210 includes, inter alia, an SMS—Deliver header 2240, and a TP-UD 2260. The SMS—Deliver header 2240 is configured to include a PID 2242, a DCS 2244, and an originating address 2246. The TP-UD 2260 is configured to store the content of the SMS message. For example, the TP-UD 2260 is configured to contain up to 140 bytes. The service provider 1055 is preferably configured to convert an incoming SMS—Submit (e.g., the SMS—Submit message 2110) into a SMS—Deliver (e.g., the SMS—Deliver message 2210), without substantially changing the substantive content of the TP-UD 2160. The service provider 1055 is configured to convert the TP-UD 2160 into the TP-UD 2260 as is (e.g., the information contained in the TP-UD 2160 is substantially unchanged). The network plug-in 1040 can be configured as a stand-alone server and/or can be integrated into the service provider 1055. The SMS—Deliver message 2210 can be assembled as described in FIG. 17 and described in U.S. application Ser. No. 11/625,091.

Figure 8:
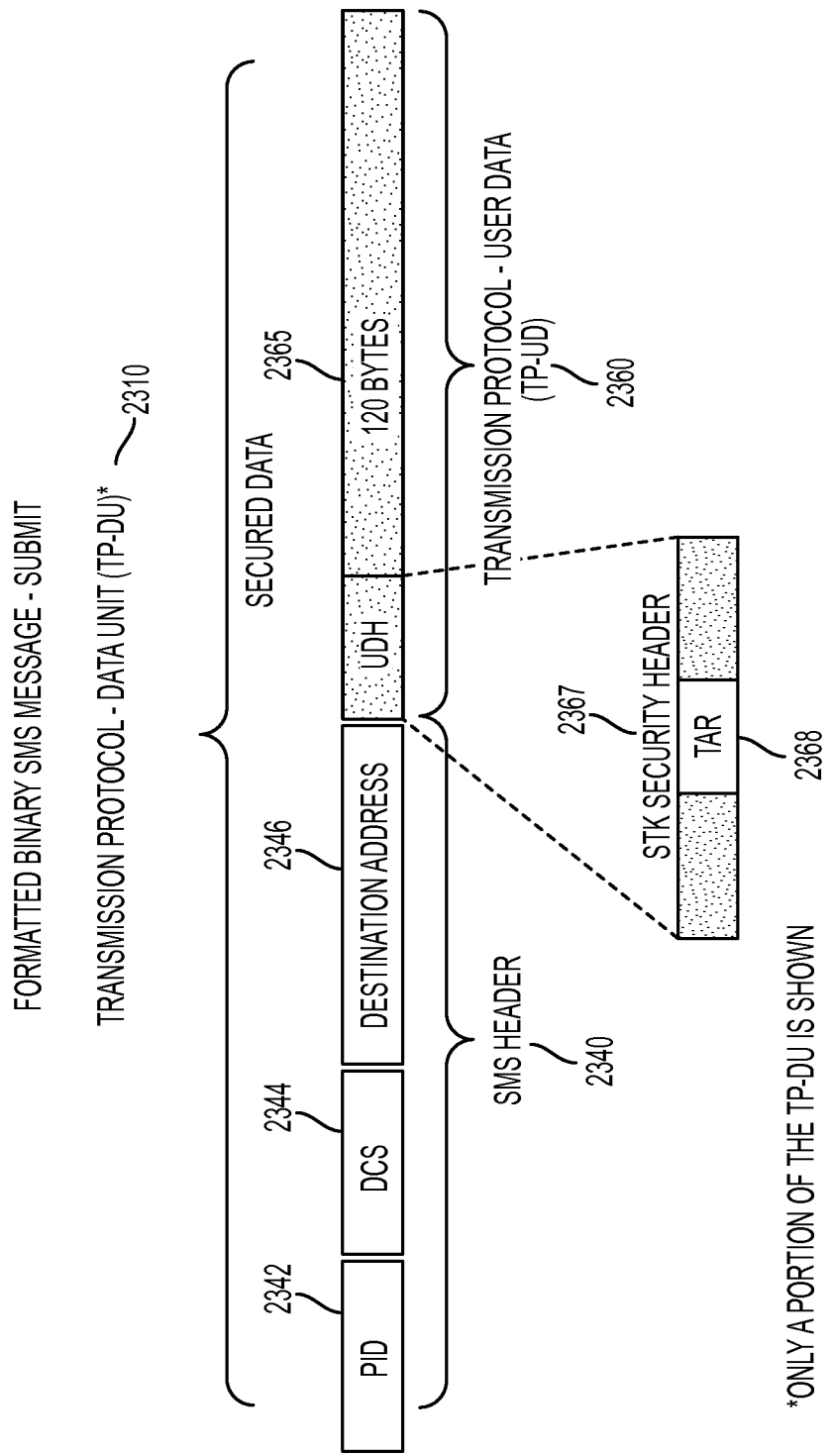
FIG. 8 is a diagram of a portion of an information packet.

Referring to FIG. 8, a formatted binary SMS—Submit message TP-DU 2310 includes, inter alia, an SMS header 2340, and a TP-UD 2360. The SMS message header 2340 includes a PID 2342, a DCS 2344, and a destination address 2346. The TP-UD 2360 includes an STK Security Header 2367 and a secured data 2365. The STK Security Header 2367 is configured to contain a Toolkit Application Reference (TAR) value 2368. The application modules 1015, 1025, and 1035 are loaded on the (U)SIM with a TAR value 2368 that is associated with the respective application module. The application module 1015 is configured to dynamically assign different TAR values 2368 depending on the message type. There is, however, preferably a single TAR value 2368 for each outgoing formatted binary SMS message, although other configurations are possible. The application module 1015 is configured to use the TAR values to communicate with a remote server component that is configured to provide additional intelligence and processing ability. For example, the application module 1015 is configured to submit a communication to the network plug-in 1040 via the service provider 1055 prior to the delivery of an SMS message to the application module 1025. The application module 1015 can be configured to assemble the TP-UD 2160 (e.g., as shown in FIG. 17 and described in U.S. application Ser. No. 11/625,091).

Figure 9:
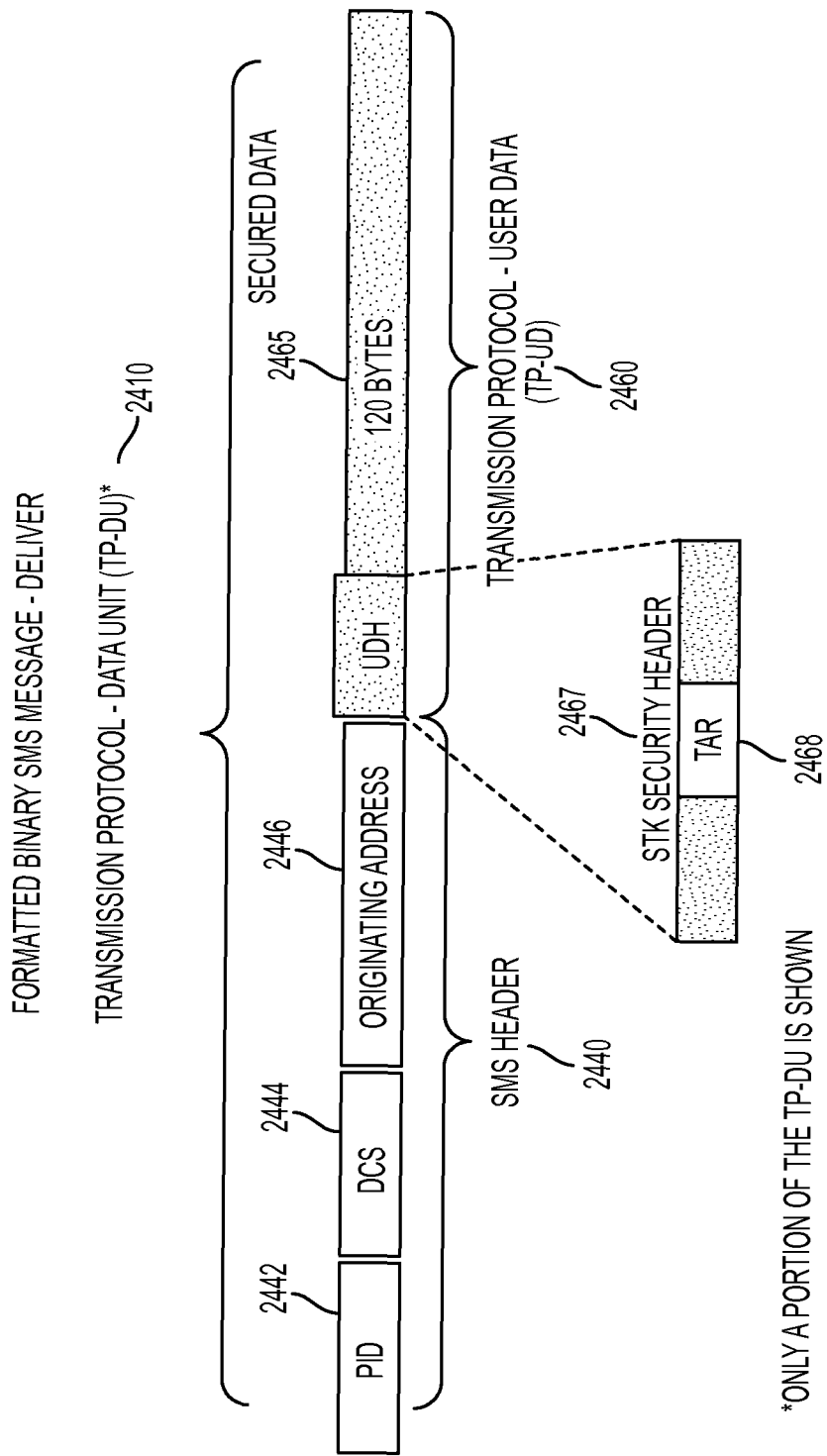
FIG. 9 is a diagram of a portion of an information packet.

Referring to FIG. 9, a formatted binary SMS—Deliver message TP-DU 2410 includes, inter alia, an SMS message header 2440, and a TP-UD 2460. The SMS message header 2440 includes a PID 2442, a DCS 2444, and an originating address 2446. The TP-UD 2460 includes a SIM Tool Kit (STK) Security Header 2467 and a secured data 2465. The STK Security Header 2467 is configured to contain a TAR value 2468. The application module 1015 is configured to dynamically assign different TAR values 2468 depending on the message type. There is, however, preferably a single TAR value 2468 for each incoming formatted binary SMS message, although other configurations are possible. For example, the communication device can recognize that an incoming message is a CallerXchange SMS message by the TAR value included in the message. The originating address 2446 of the formatted binary SMS—Deliver message is preferably the only component within the SMS message header 2440 that substantively differs from the formatted binary SMS—Submit message header 2440, which contains a destination address 2446 instead. The service provider 1055 receives the formatted binary SMS—Submit message and sends it to the network plug-in 1040 for the processing. The SMS—Deliver message 2410 can be assembled as described U.S. application Ser. No. 11/625,091.

Referring to FIGS. 4-5, the network plug-in 1040 is configured to process SMS messages from the communication devices 1010, 1020, and 1030. The network plug-in 1040 is configured to receive an SMS message from the communication device 1010. The network plug-in 1040 is configured to examine the incoming TAR value (e.g., the TAR value 2368) to determine whether the incoming SMS message is a provisioning request (e.g., the provisioning request message 1456), a contact information SMS message (e.g., the contact information processing SMS message 1057), or an SMS message including MobileStats information (e.g., the MobileStats SMS message 1458).

The service provider 1055 is configured to convert SMS—Submit messages (e.g., the formatted SMS—Submit 2310) into SMS—Deliver messages (e.g., the SMS—Deliver message 2410). Thus, in typical operation of the system 1000, the communication device 1010 sends a SMS—Submit message to the service provider 1055, the service provider 1055 converts the SMS—Submit message to an SMS—Deliver message, and provides the SMS—Deliver message to the network plug-in 1040. Likewise, in typical operation of the system 1000, the service provider 1055 receives an SMS—Submit message from the network plug-in 1040, converts the SMS—Submit message to an SMS—Deliver message, and provides the SMS—Deliver message to the intended recipient (e.g., the communication device 1020).

To process an incoming provisioning request message 1456, the network plug-in 1040 is configured to perform an initialization procedure. For example, the network plug-in 1040 is configured to perform multiple tasks upon receiving the provisioning request message 1456. The network plug-in 1040 is configured check if the communication device 1010 is listed in the blacklist database 1042 by checking, for example, the TAC value stored in the communication device 1010. The network plug-in 1040 is configured to register the operation mode of the first user application module 1015 within the MSISDN database 1044. The network plug-in 1040 is configured to determine if the application module 1015 complies with STK standards. In addition to when an incoming provisioning request is received, the network plug-in 1040 can also be configured to perform the initialization procedure at other times, e.g., upon receiving a request from an International Mobile Equipment Identity tracking provider.

The network plug-in 1040 is configured to determine if the communication device 1010 is listed in the blacklist database 1042 and to create a provisioning response. The network plug-in 1040 is configured to extract a TAC value from the provisioning request SMS message 1456 (e.g., from the TP-UD portion of the provisioning request). The network plug-in 1040 is configured to search the blacklist database 1042 using the TAC value as a key. The network plug-in 1040 is configured create a provisioning response that indicates to the application module 1015 that it should set its operation mode to "Disable" or "Receive and Send" when the TAC value is found in the blacklist database 1042. The network plug-in 1040 is configured to create a provisioning response that indicates to the application module 1015 that it should set its operation mode to "Send and Receive" when the TAC value is not found in the blacklist database 1042. Using a provisioning response received from the network plug-in 1040, the application module 1015 is configured to store the last TAC value of the communication device 1010, and to, if the stored value is the same during subsequent startups, (e.g., if the user did not upgrade to a new communication device) skip requesting that the network plug-in 1040 check the blacklist database 1042.

Figure 10:
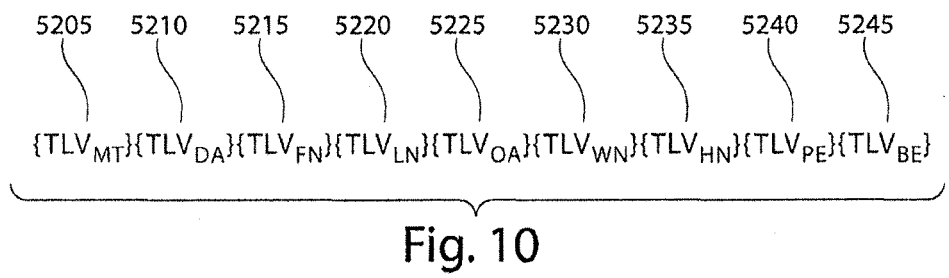
FIG. 10 is a table of information contained in a sub-portion of the information packets shown in FIGS. 8-9.

The network plug-in 1040 is configured to create the provisioning response and to send the provisioning response to the application module 1015. The network plug-in 1040 is configured to include in the provisioning response information that is indicative of the TAC value of the communication device 1010 along with information indicative of the operation mode of the communication device 1010. The network plug-in 1040 is configured to prepare the provisioning response, for example, using a Tag-Length-Value (TLV) format (e.g., as shown in FIG. 10, and as described in U.S. application Ser. No. 11/625,091). The network plug-in is configured to create a tag portion of the TLV string using a single-octet identifier which identifies a parameter (e.g., a TAC value field). The network plug-in 1040 is configured to create a length portion of the TLV string using a single-octet indicating the length of the corresponding value portion of the TLV string in octets, preferably not including the type and length fields. The network plug-in 1040 is configured to create a value portion of the TLV string that is 1 to 32 octets in length that, for example, contains the specific value for the parameter (e.g., a TAC value). The network plug-in 1040 is configured to concatenate multiples TLV strings. The network plug-in 1040 is configured to create a secure SMS message (e.g., according to the 3GPP Technical Specification 03.48), and embed the provisioning response (e.g., one or more TLV strings) in the secure data part of the SMS message (e.g., the TP-UD 2360). The network plug-in 1040 is configured to send the secure SMS message to the communication device 1010.

The network plug-in 1040 is further configured to update the MSISDN database 1044. The network plug-in 1040 is configured to store information in the MSISDN database 1044 that is indicative, for example, of whether the application module 1015 is enabled or disabled for a given MSISDN. The network plug-in 1040 is also configured to store operation mode information related to the application module 1015 (e.g., in the one of the databases 1042, 1044, and/or 1046).

The network plug-in 1040 is configured to make available CallerXchange usage information. The network plug-in 1040 is configured to send usage information to a server, and/or to advertise that new information is available for retrieval at a given storage location (e.g., at a database). The server can be part of a mobile operator's network, or be located elsewhere.

To process an incoming MobileStats SMS message 1458, the network plug-in 1040 is configured provide information than can be used to produce the MobileStats reports 1085. The network plug-in 1040 is configured to retrieve the TLV-coded secure data part of the MobileStats SMS message 1458. The network plug-in 1040 is configured to parse the TLV elements from the MobileStats SMS message 1458 and create a new entry in the statistics storage 1046 that includes the information parsed from the MobileStats SMS message 1458. The network plug-in 1040 is configured to send a notification to the repository 1080 indicating that one of the MobileStats SMS message 1458 was received. The notification can be sent to the repository 1080 simultaneously with the parsing of the MobileStats SMS message 1458, and/or at other times. The network plug-in 1040 is configured to store the originating address (e.g., an address of the communication device 1010), a time stamp of the SMS message 1458, and TLV values contained in the SMS message 1458 in the statistics storage 1046. The MobileStats reports 1085 can be generated using the information contained in the storage 1046. The network plug-in 1040 can be configured to perform additional tasks upon receipt of the SMS message 1458.

To process an incoming contact information SMS message 1457, the network plug-in 1040 is configured to facilitate the sharing of contact information contained therein. The network plug-in 1040 is configured to receive an SMS—Deliver message (e.g., the SMS—Deliver message 2410) from the service provider 1055. The network plug-in 1040 is configured to transform the SMS—Deliver message received from the service provider 1055 to the SMS—Submit message (e.g., the SMS—Submit 2310), e.g., by including an originating address in the SMS—Submit message. The remainder of this portion of the description assumes that the SMS—Deliver message 2410 is received by the network plug-in 1040, although other SMS message types can be received and processed.

The network plug-in 1040 is configured to convert the SMS—Deliver message 2410 into an SMS—Submit message (e.g., the SMS—Submit message 2310). The network plug-in 1040 is configured to create a security header of the SMS—Submit message 2310 according to the 3GPP Technical Specification. The network plug-in 1040 is configured to copy the TLV values from the secured data 2465 of the SMS—Deliver message 2410 to the secured data 2365 of the SMS—Submit message 2310. The network plug-in 1040 is configured to encapsulate the SMS—Submit message 2310 within the SMPP protocol prior to sending it to the service provider 1055. The network plug-in 1040 can be configured to add a user's originating address (e.g., the address of the communication device 1010) to the SMS—Submit message 2310, or can be configured not to add the user's originating address. For example, the network plug-in 1040 can be configured to append the originating address 2446 to the secured data 2365 of the SMS—Submit message 2310, for example, as a TLV field (e.g., TVL.sub.OA) that is configured to be a TLV representation of the originating address.

Figure 11:
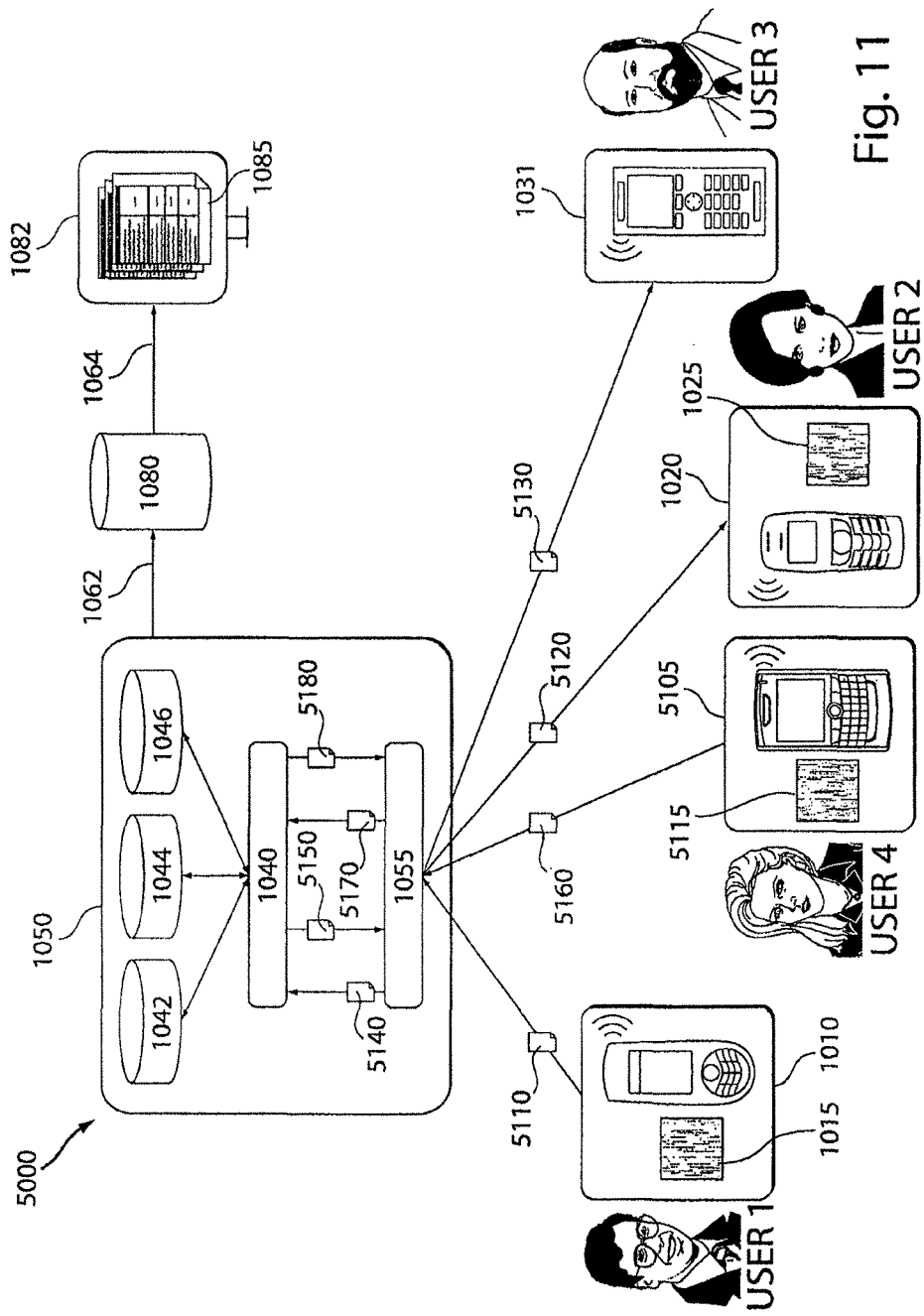
FIG. 11 is a schematic of a communication system including communication devices.

Referring to FIG. 11, a mobile contact management information system 5000 includes communication devices 1010, 1020, 1031, and 5015, the network 1050, the repository 1080, and the display 1082. The communication device 5015 includes an application module 5115. The application modules 1015 and 1025, 5115 are configured to communicate with the network plug-in 1040 using SMS messages. The system 5000 is, for example, a UMTS Mobile Operator Network. The system 5000, however, can be another type of mobile network, such as WCDMA (GSM), CDMA, CDMA2000, etc., or a next generation phone system.

The network plug-in 1040 is configured to process a formatted binary SMS message at predetermined times such as when a communication event (e.g., a telephone call, an SMS message, etc.) between the first and second users (e.g., using the communication devices 1010 and 1020) is concluded. After terminating the call, at least one of the first and second users is automatically prompted to provide contact information to the other user. For example, after termination of the call, the first user is automatically prompted to provide the first user's contact information to the second user. One or both parties to the call can be automatically prompted to provide contact information to the other caller. For example, only the caller who initiated the call can be prompted, only the caller who received the call can be prompted, both callers can be prompted, etc. The below discussion assumes that the first user is the user that is prompted to provide contact information after terminating the call.

The application module 1015 is configured to prompt the first user to select whether or not to provide contact information to the second user, and to select which contact information, if any, to provide to the second user. The application module 1015 is configured to prompt the first user to choose whether or not to provide contact information to the second user by, for example, providing a prompt on a display of the communication device 1010. The application module 1015 is also configured to prompt the first user to choose a specific set of contact information to provide to the second user (e.g., work only, home only, assistant only, work and home, etc.). If the first user chooses to provide contact information, the application module 1015 retrieves the first user's contact information (e.g., from the SIM in the communication device 1010). The application module 1015 preferably retrieves only the desired information, e.g., only "work" information. The application module 1015 is configured to generate and send a formatted binary SMS—Submit message 2310 (e.g., shown as SMS message 5110) to the communication device 1020 (although an unformatted text SMS message, as described below, can also be sent).

The system 5000 is configured such that before the SMS message 5110 is transmitted to another communication device, the generated SMS message preferably goes through intermediate processing by the network 1050. The service provider 1055 is configured to convert the SMS message 5110 (e.g., which is the SMS—Submit message 2310) to the SMS—Deliver message 2410 (e.g., shown as message 5140) and to provide the message 5140 to the network plug-in 1040. The service provider 1055 is configured to encapsulate the SMS message 5140 using SMPP protocol prior to sending the message 5140 to the network plug-in 1040. The network plug-in 1040 is configured to gather desired information and convert the SMS message 5140 from the SMS—Deliver message 2410 to the SMS—Submit message 2310 (e.g., shown as message 5150). Preferably, the network plug-in 1040 is configured to not substantially change the TP-UD portion of the SMS message 5140 when converting it to the TP-UD portion of the SMS message 5150. The network plug-in 1040 is configured to encapsulate the binary SMS—Submit message using the SMPP protocol and to send the SMS message 5150 to the service provider 1055. The service provider 1055 is configured to receive the SMS 5150 and forward it to the second user communication device 1020 as an SMS—Deliver message 2410 (e.g., shown as message 5120).

The type of SMS message (e.g., unformatted text SMS or formatted binary SMS) sent to and/or from the application modules and the network plug-in 1040 can vary. For example, the message type can be set during the initial configuration of the respective application modules by a mobile network operator. The message types sent and/or received can be any combination of unformatted text SMS messages and formatted binary SMS messages. Formatted binary SMS messages, however, are the preferred method of communication.

The system 5000 is also configured to receive and send SMS messages to and/or from communication devices that do not include an application module. The below discussion assumes that a fourth user is the user that is prompted to provide contact information to a third user after terminating a communication event, although other configurations are possible. Similar to above, after the termination of a communication event, here between the third and fourth users (e.g., using the communication devices 1031 and 5105, respectively), the fourth user is prompted to provide contact information to the third user. The application module 5115 is configured to prompt the fourth user to choose whether or not to provide contact information to the third user. The application module 5115 is also configured to prompt the fourth user to choose a specific set of contact information to provide to the third user (e.g., work only, home only, assistant only, work and home, etc.). If the fourth user elects to provide contact information, the application module 5115 is configured to retrieve the contact information which the fourth user desires to provide to the third user (e.g., from the SIM in the communication device 5105). The application module 5115 is configured to send an SMS—Submit message, (e.g., shown as SMS message 5160) to the communication device 1030.

The system 5000, is configured such that before the message 5160 reaches the communication device 1031, the message 5160 preferably goes through intermediate processing by the network 1050. For example, the service provider 1055 is configured to convert the SMS message 5160, which is an SMS—Submit message to an SMS—Deliver message (e.g., shown as the message 5170). The service provider 1055 is configured to encapsulate the message 5170 using SMPP protocol, although other protocols can be used. The service provider is configured to provide the message 5170 to the network plug-in 1040. The network plug-in 1040 is configured to convert the SMS message 5170, to an SMS—Submit message 2110 (e.g., shown as message 5180). Preferably, the TP-UD portion of the SMS messages 5170 and 5180 are substantively identical. The service provider 1055 is configured to receive the SMS message 5180 and to preferably forward it to the communication device 1031 as an SMS—Deliver message 2210 (e.g., shown as message 5130).

The network plug-in 1040 is configured to process contact information SMS messages sent between two users, such as the first and second users. The network plug-in 1040 is configured to, e.g., after receiving a contact information SMS such as the message 5140, to retrieve the secure data in the TLV format from the TP-UD of the message 5140. The network plug-in 1040 is configured to retrieve the Transmission Protocol-Originating address (TP-OA) from the header of the message 5140. The network plug-in 1040 is configured to retrieve the Transmission Protocol—Destination Address (TP-DA) from the TLV structure of the message 5140. The network plug-in 1040 is configured to transform the SMS—Deliver message 5140 into the SMS—Submit message 5150. The network plug-in 1040 is configured to set the destination address in the message 5150 using the TP-DA from the message 5140.

The network plug-in 1040 is configured to determine how the second user's communication device is configured. The network plug-in 1040 is configured to perform a lookup in the MSISDN database 1044 using the TP-DA retrieved from the message 5140 to determine if the second user's communication device (e.g., the communication device 1020) is registered with the network plug-in 1040 and if the communication device 1020 is configured to comply with the mobile network standards. For example, the network plug-in 1040 is configured to determine whether the communication device 1020 includes the application module 1025 and if so, whether the application module 1025 is in an active operation mode (e.g., "send and receive" or "receive and send"). The network plug-in 1040 is configured to generate a formatted SMS message as the message 5150 when the communication device 1020 has an active application module 1025, and other generate a text SMS message as the message 5150. The network plug-in 1040 is configured to update, respectively, a formatted SMS message counter and a text SMS message counter. The counters can be used to track usage of the network plug-in 1040 (e.g., for billing purposes).

Figure 12:
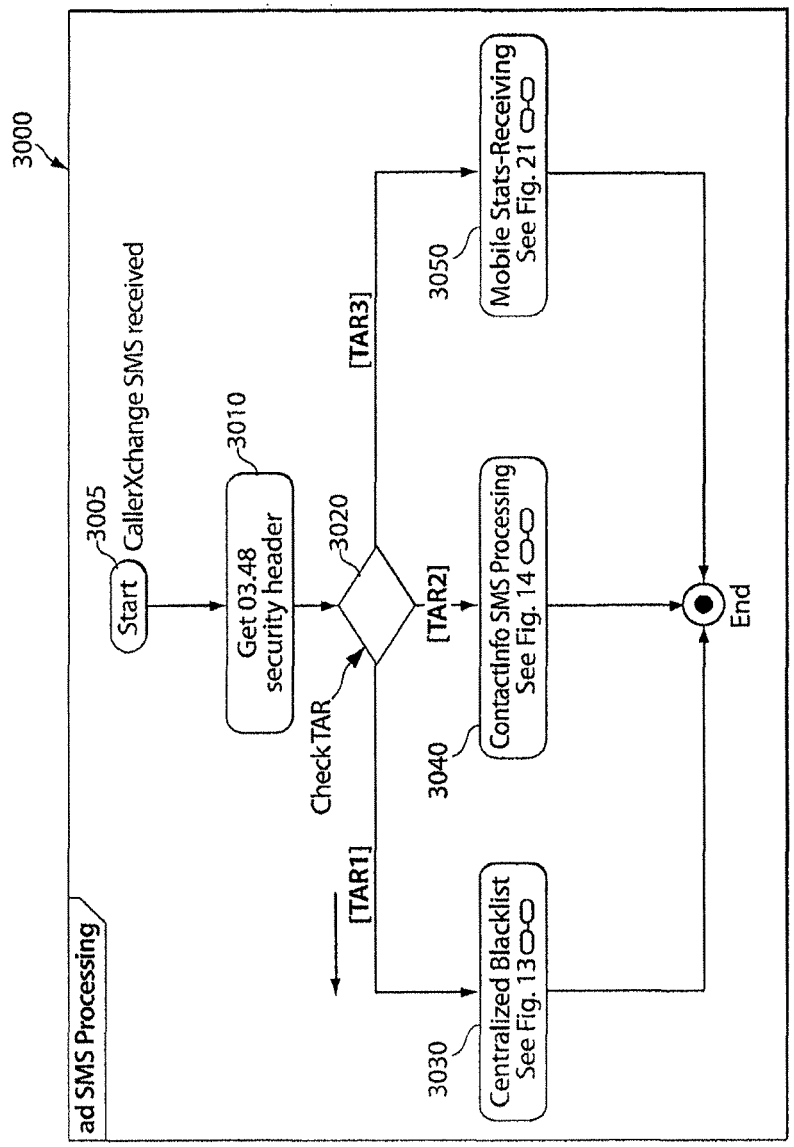
FIG. 12 is a block flow diagram of a process of processing an incoming SMS message.

In operation, with reference to FIG. 12 and further reference to FIG. 11, a process 3000 for processing an incoming SMS message using the network plug-in 1040 includes the stages shown. The process shown in FIG. 12, however, is exemplary only and not limiting. The process shown in FIG. 12 can be altered, e.g., by having stages added, removed, altered, and/or rearranged. While the process 3000 shows specific types of SMS messages that can be received by the network plug-in 1040, and specific processing that occurs, other message types can be received, and other processing can be performed. The process 3000 is described with reference to the communication devices 1010 and 1020, although other communication devices can be used.

At stage 3005, the process 3000 begins. Stage 3005 preferably corresponds to when the network plug-in 1040 receives an incoming SMS message from the communication device 1010 (e.g., the message 5140). The message is relayed by the service provider 1055 from the application module 1015. The message 5140 is a formatted SMS message (e.g., the SMS—Deliver message 2410), although other message types can be received and processed.

At stage 3010, the network plug-in 1040 retrieves the security header as defined in the 3GPP Technical Specifications 03.48 from the header of the SMS message (e.g., the Security Header 2367 of the SMS—Submit message 2310). The network plug-in 1040 is configured to parse a TAR value contained in the security header of the incoming SMS message.

At stage 3020, the network plug-in is configured to determine what type of SMS message the incoming SMS message is. The network plug-in 1040 is configured to compare the TAR value in the incoming SMS message to a list of known TAR values to determine how to further process the incoming SMS message. If the TAR value of the incoming SMS message is equal to a TAR value corresponding to a provisioning request, then the incoming SMS is a provisioning request SMS meant for centralized blacklist processing and the process 3000 continues to stage 3030 (e.g., see FIG. 12 and corresponding description). If the TAR value of the incoming SMS message is equal to a TAR value corresponding to contact information SMS messages, then the process 3000 continues to stage 3040 (e.g., see FIG. 14 and corresponding description). If the TAR value of the incoming SMS message is equal to a TAR value corresponding to a MobileStats SMS message, then the process 3000 continues to stage 3050 (e.g., see FIG. 21 and corresponding description).

Figure 13:
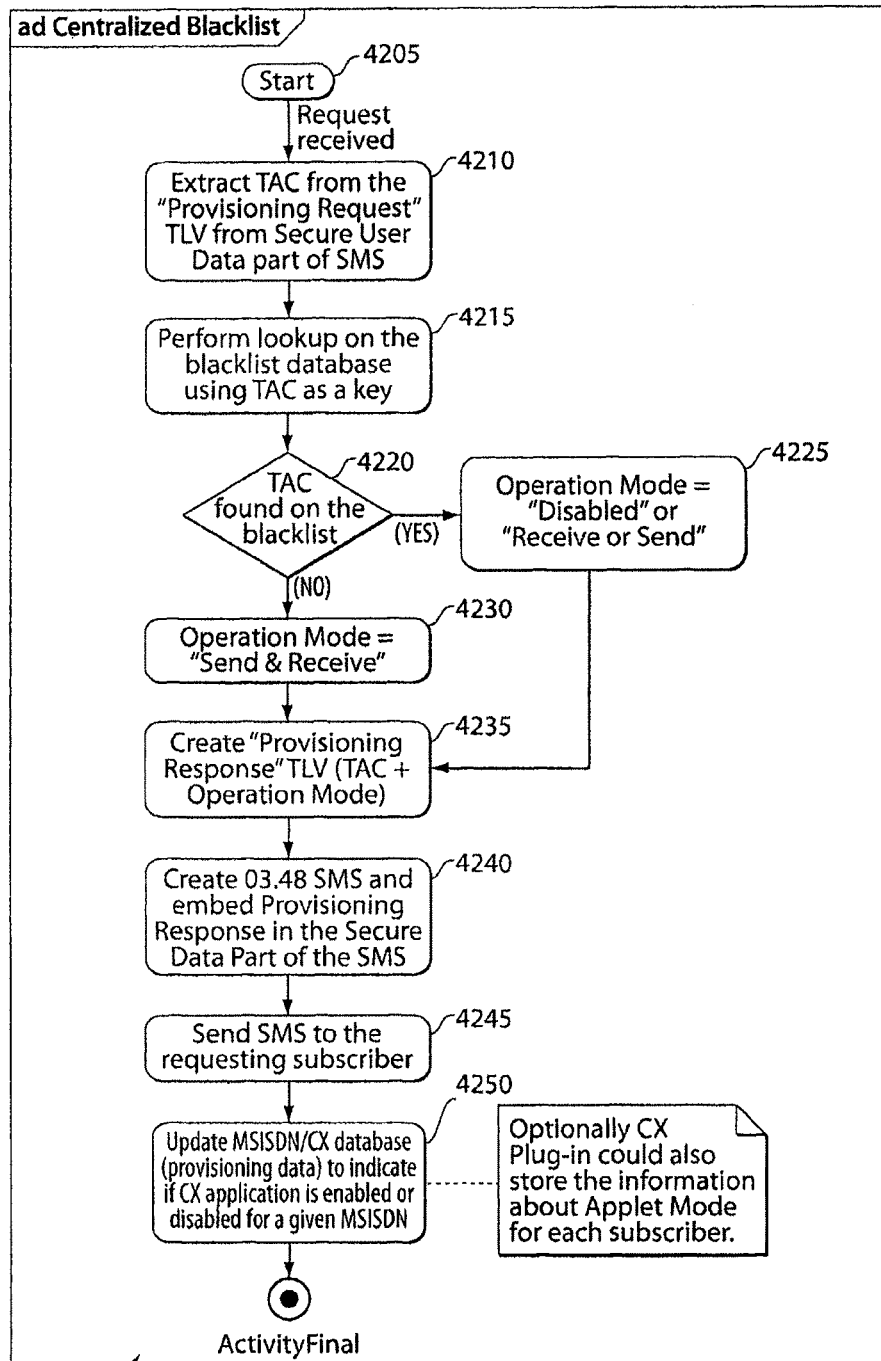
FIG. 13 is a block flow diagram of a process for performing centralized blacklist processing.

In operation, with reference to FIG. 13 and further reference to FIG. 11, a process 4200 for performing centralized blacklist processing includes the stages shown. The process 4200, however, is exemplary only and not limiting. The process 4200 can be altered, e.g., by having stages added, removed, altered, and/or rearranged. The process 4200 is described with reference to the communication device 1010, although other communication devices can be used with the process 4200. Further, the process 4200 is described as if the message 5140 was determined to be a provisioning request by the process 3000.

At stage 4210, the network plug-in 1040 parses the TAC value from the TP-UD 2465 of the message 5140.

At stage 4215, the network plug-in 1040 performs a search within the blacklist database 1042 using the TAC value as a key.

At stage 4220, if the TAC is found in the blacklist database 1042 the process 4200 continues to stage 4225, otherwise the process 4200 continues to stage 4230.

At stage 4225 the network plug-in sets the operation mode of the communication device 1015 is to "Disable" or "Receive and Send." The operation mode is stored in the MSISDN database 1044 in conjunction with the creation of the provisioning response during stage 4235. The network plug-in 1040 sends the operation mode to the corresponding application module. If the user acquires a new mobile device, the TAC value can be extracted and checked against the blacklist database 1042 to determine the desired operation mode. From stage 4225, the process 4200 continues to stage 4235.

At stage 4230, the network plug-in 1040 sets the operation mode of the communication device 1015 to "Send and Receive." The operation mode is stored in the MSISDN database 1044 in conjunction with the creation of the provisioning response during stage 4235. The network plug-in 1040 sends the operation mode to the corresponding application module. If the user acquires a new mobile device, the TAC value will be extracted and checked against the blacklist database 1042 to determine the proper operation mode.

At stage 4235, the network plug-in 1040 creates a provisioning response containing the TAC value of the communication device 1015 along with the operation mode determined during stages 4225 or 4230. The provisioning response is prepared using the TLV format, although other formats can be used. The tag portion of the TLV string is a single-octet identifier that can uniquely define a parameter (e.g., a TAC value field). The Length portion of the TLV string is preferably a single-octet indicating the length of the corresponding value portion of the TLV string in octets, preferably not including the type and length fields. The value portion of the TLV string is preferably from 1 to 32 octets in length and preferably contains the specific value for the parameter (e.g., a TAC value). The parameters preferably directly follow each other in the body, which is a stream of octets.

At stage 4240, the network plug-in 1040 creates a secure SMS message, according to the 3GPP TS03.48, and embeds the provisioning response in the secure data part of the SMS.

At stage 4245 the network plug-in 1040 sends the secure SMS message containing the provisioning response to the communication device 1010.

At stage 4250, the network plug-in 1040 updates the MSISDN database 1044 and the blacklist database 1042 to indicate if the application module is enabled or disabled for a given MSISDN. Optionally, the network plug-in 1040 also stores the operation mode information for each subscriber within the MSISDN database 1044.

Figure 14:
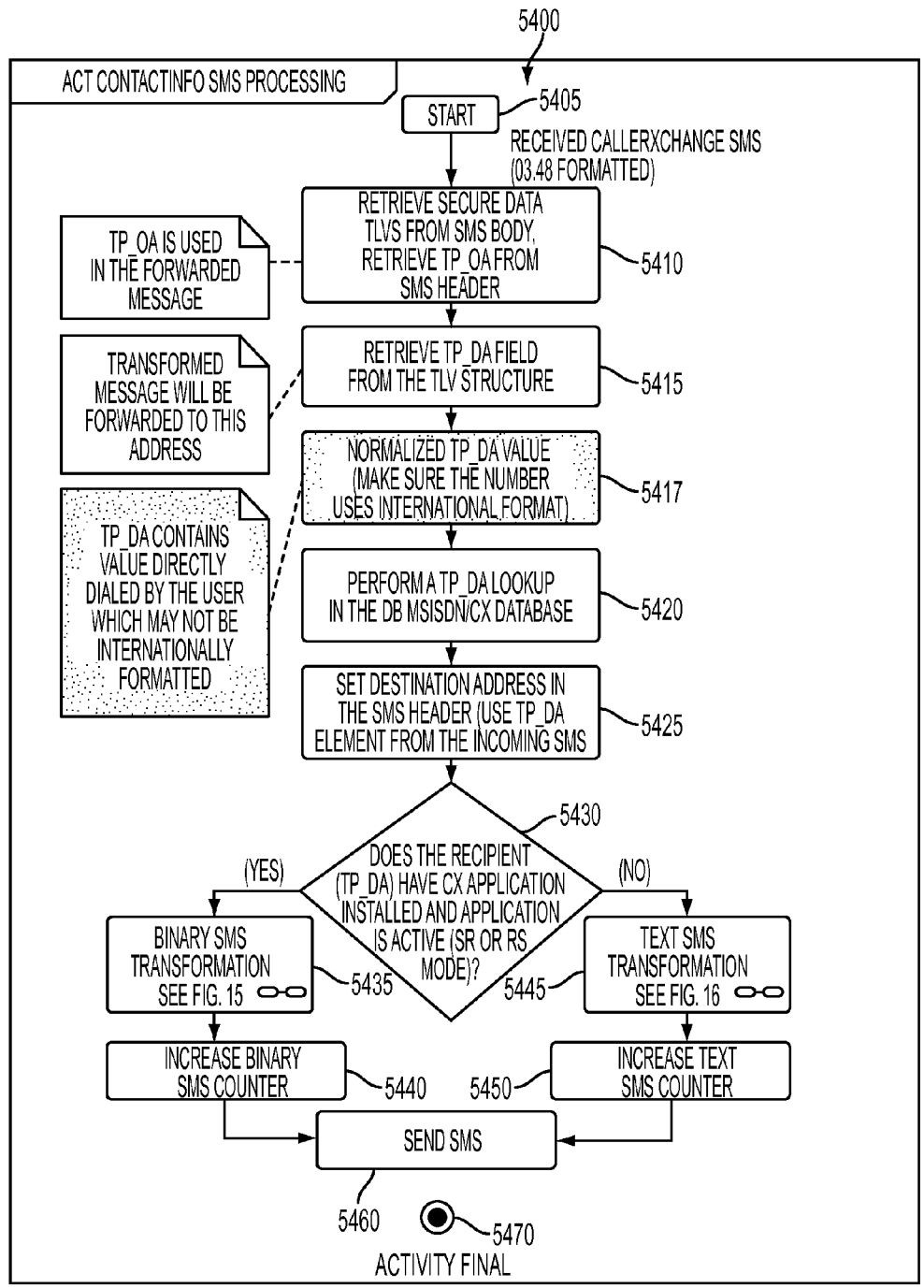
FIG. 14 is a block flow diagram of a process for processing contact information included in a formatted SMS message.

In operation, with reference to FIG. 14 and with further reference to FIG. 11, a process 5400 for processing contact information included in a formatted binary SMS message environment within the network plug-in 1040 includes the stages shown. The process 5400, however, is exemplary only and not limiting. The process 5400 can be altered, e.g., by having stages added, removed, altered, and/or rearranged. While the process 5400 is described in context of receiving and processing the SMS message 5140 and creating the SMS 5150, the process 5400 can also be used to receive and create other SMS messages (e.g., the SMS messages 5170 and 5180). While the process 5400 is described in the context of providing contact information from the communication device 1010 to the communication device 1020 using formatted SMS messages, other communication device and/or SMS types can be used. Further, the process 5400 is described as if the message 5140 was determined to be the contact information SMS message 1457 by the process 3000.

At stage 5410, the network plug-in 1040 receives the SMS message 5140, e.g., a an SMS—Deliver message that has been formatted according to the 3GPP Technical Specification 03.48. The network plug-in 1040 retrieves the secure data from the message 5140 (e.g., the TLV values that include a user's contact information). The network plug-in 1040 also retrieves the TP-OA from the SMS header.

At stage 5415, the network plug-in 1040 retrieves the TP-DA information from the message 5140. At stage 5417, the network plug-in 1040 normalizes the TP-DA value to ensure that the number uses international format.

At stage 5420, the network plug-in 1040 performs a TP-DA lookup in the database 1044 to see if intended recipient (e.g., the communication device 1020) is registered and is configured to comply with the desired mobile network standards (e.g., to receive SMS messages). The network plug-in 1040 checks if the TP-DA of the second communication device is listed in the MSISDN database 1044, although other databases can be used.

At stage 5425, the network plug-in 1040 transforms the SMS—Deliver message 5140 into an SMS—Submit message 5150. The network plug-in 1040 sets the destination address in the SMS header using the TP-DA from the SMS—Deliver message 5140.

At stage 5430 the network plug-in 1040 checks the database 1044 to see whether the communication device 1020 has the application module 1025 installed and if the application module 1025 is in the active operation mode, which is, for example, either "send and receive" or "receive and send." If the communication device 1020 has an active application module 1025, then the process 5400 continues to stage 5435, otherwise the process 5400 continues to stage 5445.

Figure 15:
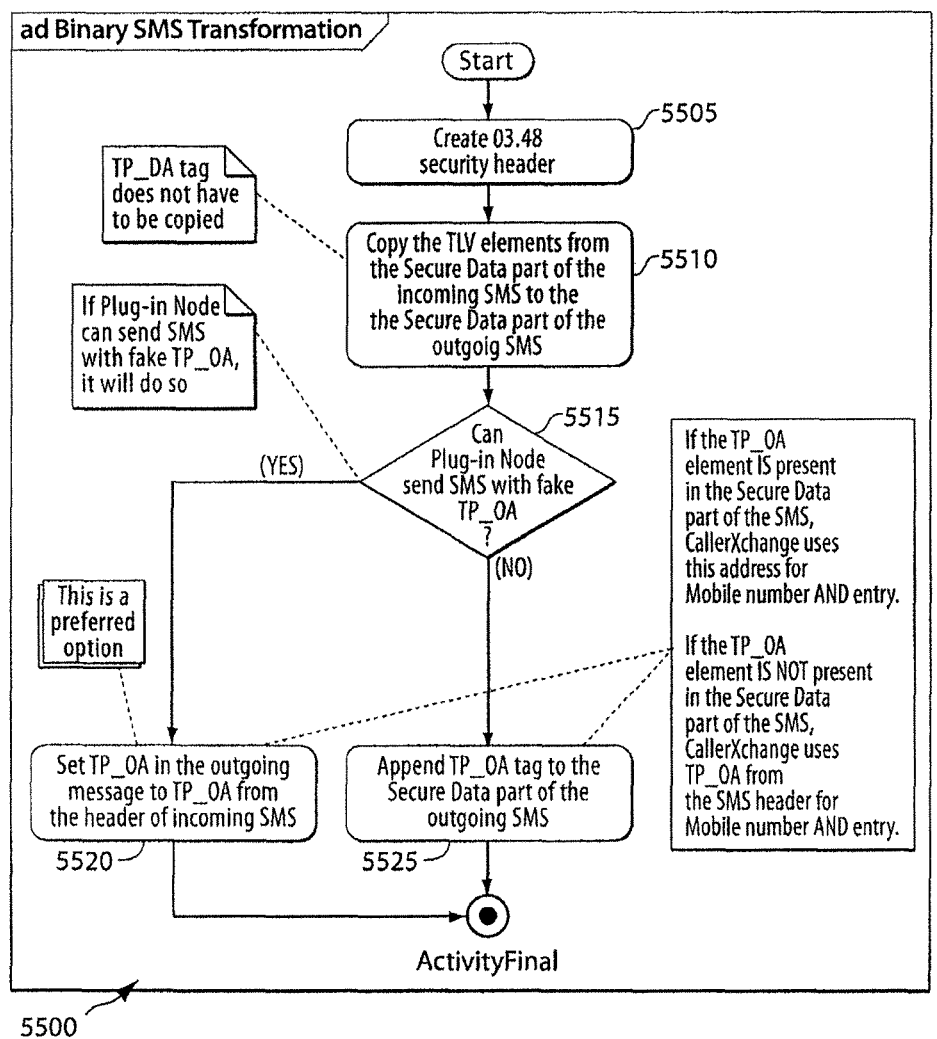
FIG. 15 is a block flow diagram of a process for SMS message transformation.

At stage 5435 the formatted binary SMS transformation is made (e.g., as described with respect to FIG. 15 and corresponding description).

At stage 5440, the network plug-in 1040 increases the formatted binary SMS message counter.

At stage 5445, the unformatted text SMS transformation is made (e.g., as described in FIG. 16 and corresponding description).

At stage 5450, the network plug-in 1040 increases the text SMS message counter.

At stage 5460, the network plug-in 1040 sends the message 5150 to the communication device 1020 via the service provider 1055. The message 5150 can be a formatted binary SMS message or a text SMS as described above.

In operation, with reference to FIG. 15 and further reference to FIG. 11, a process 5500 for SMS message transformation from the SMS—Deliver message 5140 to the SMS—Submit message 5150, using the network plug-in 1040 includes the stages shown. The process 5500 can be altered, e.g., by having stages added, removed, altered, and/or rearranged. Preferably the process 5500 is executed after it has been determined that a user to which an SMS message is destined for includes an active application module (e.g., as described with respect to the process 5400), although the process 5500 can be executed at other times. Further, the below description of the process 5500 assumes that the SMS being sent to and from the network plug-in 1040 is a formatted binary SMS message.

At stage 5505, the network plug-in 1040 creates a security header according to the 3GPP Technical Specification 03.48. Preferably, the 03.48 security header does not enforce any cryptographic or checksum operations on the information, although other configurations are possible (e.g., cryptographic and checksum operations can be enforced). The network plug-in 1040 creates the security header of message 5150 (e.g., which is formatted binary SMS—Submit message 2310) based on the TAR value of the incoming message 5140 (e.g., which is a formatted binary SMS—Deliver message 2410) and the length of the information contained in the SMS message (e.g., the TLV values from the secured data 2465). The network plug-in 1040 updates a template security header with correct TAR and data length values.

At stage 5510, the network plug-in 1040 copies the TLV values from the secured data 2465 of the message 5140 (e.g., which is a formatted binary SMS—Deliver message 2410, which is encapsulated within the SMPP protocol) to the secured data 2365 of the message 5150 (e.g., which is a formatted binary SMS—Submit message 2310). The network plug-in 1040 encapsulates the message 5150 within the SMPP protocol.

At stage 5515, the network plug-in 1040 checks the configuration between itself and the service provider 1055. If the configuration permits the network plug-in 1040 to add a user's originating address as the originating address 2446 (e.g., from the formatted binary SMS—Deliver message 2410), then the process 5500 continues to stage 5520, otherwise, the process 5500 continues to stage 5525. For example, the network plug-in 1040 checks to determine if it can "fake" the originating address in an SMS message.

At stage 5520, the network plug-in 1040 adds the originating address to the message 5150 that corresponds to the communication device (e.g., the communication device 1010) that sent the message 5140 and encapsulates the appropriate originating address within the SMPP protocol (e.g., the originating address is encapsulated in the SMPP protocol because the SMS—Submit message 2310 does not include an originating address header field). By "faking" the originating address, the communication device that ultimately receives the SMS message will see the address (e.g., telephone number) of the communication device 1010, rather than the address of the network plug-in 1040. The service provider 1055 uses the "faked" originating address embedded in the SMPP protocol when generating the SMS—Deliver message 2410.

At stage 5525, the network plug-in 1040 appends the originating address 2446 (as a TLV field TLV.sub.OA (e.g., which is the TLV representation for originating address)) to the secured data 2365 of the message 5150, rather than encapsulating the originating address in the SMPP protocol. The network plug-in 1040 notifies the application module of the receiving communication device (e.g., the application module 1025 of the communication device 1020) that the correct originating address is found in the TLV.sub.OA field found within the secured data 2365, rather than the TP-OA field 2446 of the SMS—Deliver message 2410. Stage 5525 can be useful, for example, to avoid a situation where the application module of a receiving communication device interprets an incoming SMS message as originating from the network plug-in 1040 rather than the communication device that originated the SMS message.

The process 5500 can also be used when a first user sends a second user's contact information to a third user. For example, the user of the communication device 1010 can send the contact information of the user of the communication device 5115 to the user of the communication device 1020. In this case, the application module 1015 is configured to prepare the SMS message 5110 and includes a tag for TLV value for the message type "Forward-a-Contact" ("FAC") (e.g., TAG_CELL_PHONE) within the body of the SMS message. The application module 1025 is configured to recognize the message type as FAC and use the TLV_CELL_PHONE as the mobile number.

Figures 3, 16:
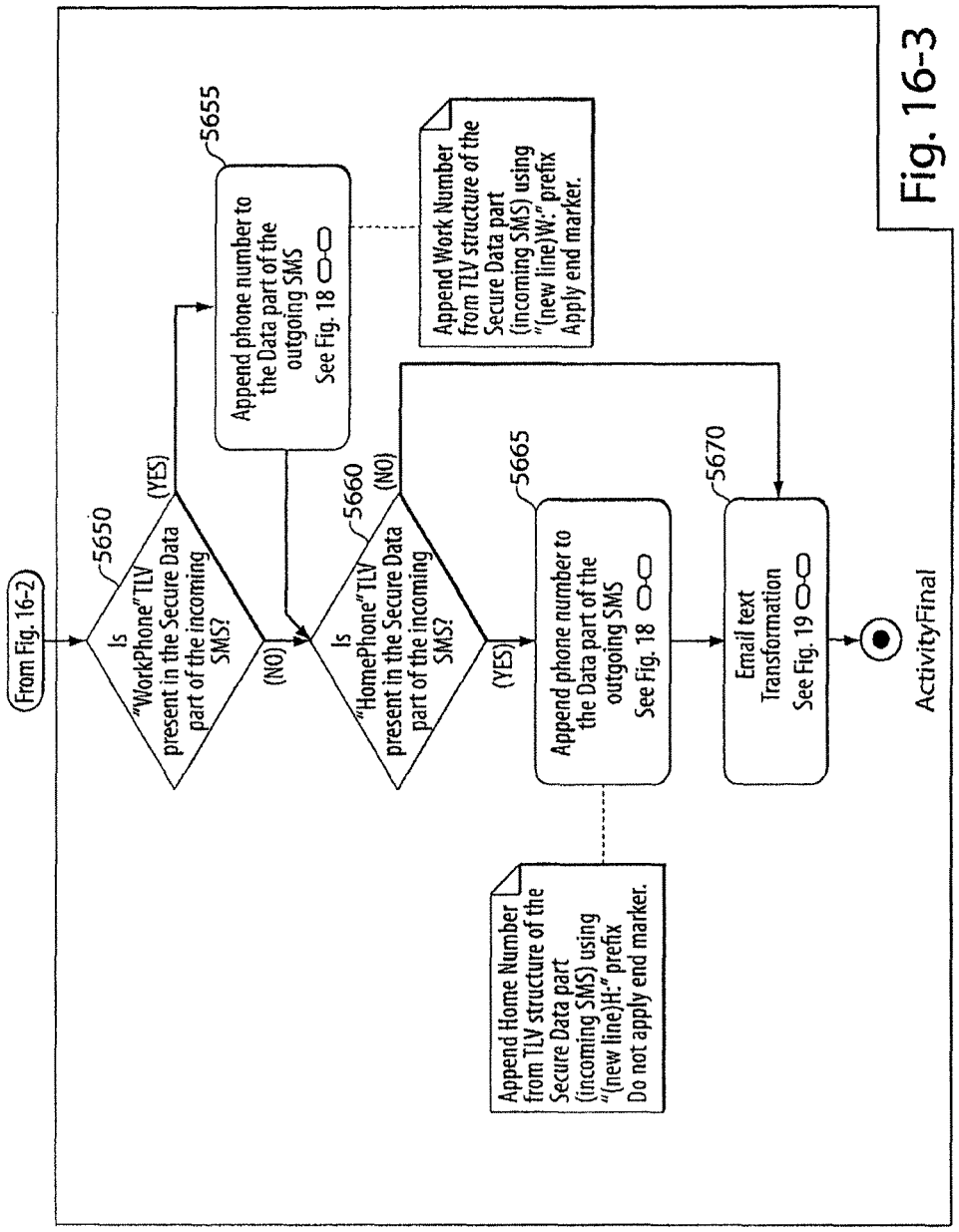

In operation, with reference to FIGS. 16-1 through 16-3 and further reference to FIGS. 11 and 17, a process 5600 for message transformation of an unformatted text SMS message within the network plug-in 1040 includes the stages shown. The process 5600, however, is exemplary only and not limiting. The process 5600 can be altered, e.g., by having stages added, removed, altered, and/or rearranged. The following description assumes that the first user application module 1015 sends the first user's contact information in a formatted binary SMS message towards the communication device 1031. Further, the process 5600 assumes that the communication device 1031 does not include an application module and that the third user has not been provisioned within the network plug-in 1040, although other configurations are possible.

At stage 5605, the network plug-in 1040 assembles the message 5180. The network plug-in 1040 takes the secured data 2465 from the message 5170 (e.g., which is the formatted binary SMS—Deliver message 2410) and appends information indicative of the secured data 2465 into the TP-UD 2160 of the message 5180 (e.g., which is the unformatted text SMS—Submit message 2110). The secured data 2465 is appended to the message 5180 as for example, an SMS header 5305.

At stage 5610, the network plug-in 1040 locates the TLV-.sub.MT 5205 (e.g., which is the TLV value for message type) in the secured data 2465 of the message 5170 (e.g., which is a formatted binary SMS—Deliver message 2410). The message type indicates whether the message 5170 is an original message or not.

At stage 5615, if the message 5170 is an original message, the process 5600 continues to stage 5620, otherwise, the process 5600 continues to stage 5625.

At stage 5625 the network plug-in 1040 locates the TLV-.sub.LN 5220 and TLV.sub.FN 5215 (e.g., TLV values for LastName and FirstName, respectively) values in the TLV formatted structure of the message 5170. The network plug-in 1040 appends information indicative of the TLV.sub.LN 5220 and TLV.sub.FN 5215 values to TP-UD 2160 of the message 5180 as a LastName field 5132 and a FirstName field 5314, respectively.

At stage 5620 the network plug-in 1040 adds a white space character 2320 at the end of the SMS header text to indicate that the SMS message is a "reply" message.

At stage 5630, the network plug-in 1040 checks the configuration between itself and the service provider 1055. If the configuration allows the network plug-in 1040 to add the first user's originating address as the originating address 2446 (e.g., from the message 5170), then the process 5600 continues to stage 5635, otherwise the process 5600 continues to stage 5645.

At stage 5632, the network plug-in 1040 determines if the message type of the incoming SMS message (or alternatively an outgoing SMS message) is set to FAC. If the message type is FAC, the process 5600 terminates at stage 5633, otherwise the process 5600 proceeds to stage 5645.

At stage 5635 the network plug-in 1040 specifies the TP-OA 2446 within the SMPP protocol as the originating address.

At stage 5640, the network plug-in 1040 appends information to the message 5180 as a function of the message type. If the message type is other than FAC, the network plug-in 1040 appends the TP-OA 2446 from the message 5180 to the TP-UD 2160 of the message 5180 as a MobileNumber field 5324. The network plug-in 1040 omits the end marker (e.g., see FIG. 18 and associated description) after the mobile number prefix (e.g., "M:") to, for example, indicate that the Mobile-Number field 5324 should not be disregarded. If the message type is FAC, the network plug-in 1040 appends the CELL_TLV from the message 5180 and applies two end markers after the mobile number prefix (e.g., "M:") to indicate that the message type is FAC.

At stage 5645 the network plug-in 1040 appends a NEW-LINE character 5310 to the TP-UD 2160 and appends the originating address 2446 into the MobileNumber field 5324 which is included in the TP-UD 2160 of the message 5180. The network plug-in 1040 also applies an end marker, which is an optional space 5325, after the MobileNumber field 5324 (e.g., see FIG. 18 and associated description), which can indicate that the MobileNumber field 5234 should be disregarded.

At stage 5650, the network plug-in 1040 checks if the TLV.sub.WN 5230 (e.g., the TLV value for WorkNumber) is present in the secured data 2465 of the message 5170. If the desired information is present, the process 5600 continues to stage 5655, otherwise the process 5600 continues to stage 5660.

At stage 5655, the network plug-in 1040 appends a NEW-LINE character 5310 to the message 5180 and appends the WorkNumber (see FIG. 18 and associated description) into a WorkNumber field 5342 which is included in the TP-UD 2160 of the message 5180 and applies an end marker, which is a space 5345, after the WorkNumber 5342.

At 5660, the network plug-in 1040 checks if the TLV-.sub.HN 5235 (e.g., the TLV value for HomeNumber) is present in the secured data 2465 of the message 5170. If the TLV.sub.HN 5235 is present, the process 5600 continues to stage 5665, otherwise, the process continues to stage 5670.

At stage 5665, the network plug-in 1040 appends a NEW-LINE character 5310 to the message 5180 and appends the HomeNumber into the HomeNumber field 5332 which is included in the TP-UD 2160 of the message 5180 and does not append the end marker.

Figure 20:
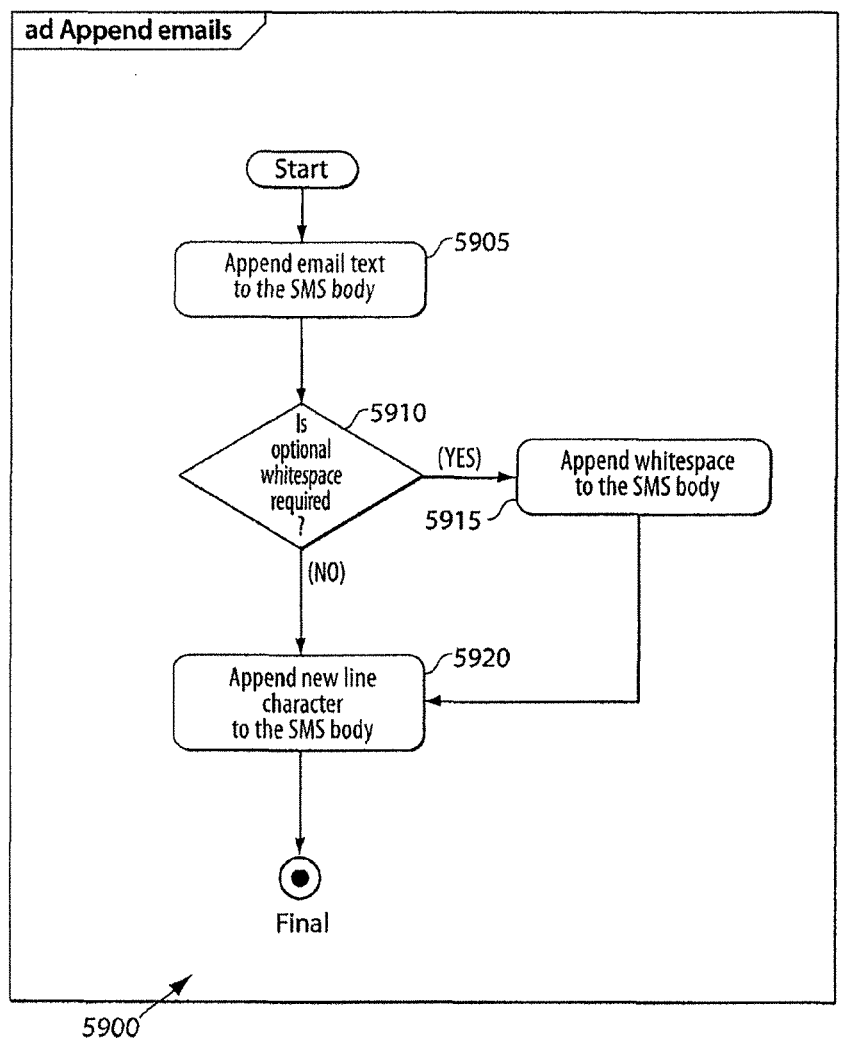
FIG. 20 is a block flow diagram of a process for appending an E-mail address to an SMS message.

At stage 5670, the network plug-in 1040 appends an E-mail address to the message 5180 (see FIG. 20 and associated description).

Figure 18:
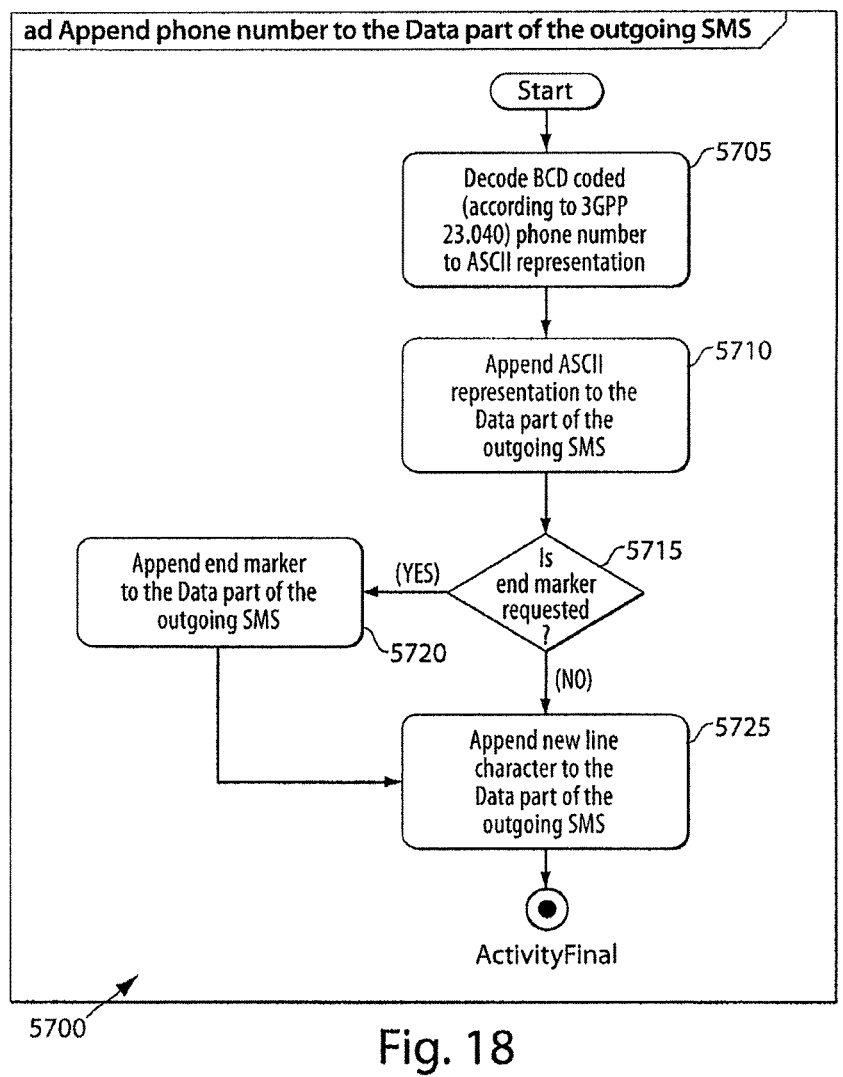
FIG. 18 is a block flow diagram of a process for appending a phone number to an SMS message.

In operation, with reference to FIG. 18 and further reference to FIGS. 11 and 17, a process 5700 for appending a phone number to the data part of the message 5180 (e.g., which is the unformatted text SMS—Submit message 2110) includes the stages shown. The process 5700, however, is exemplary only and not limiting. The process 5700 can be altered, e.g., by having stages added, removed, altered, and/or rearranged. Portions of the process 5700 explain, in further detail, some of the stages shown in FIG. 16.

At stage 5705, the network plug-in 1040 decodes the Binary Coded Decimal (BCD) coded phone number, according to the 3GPP 23.040 specifications, to an ASCII representation.

At stage 5710, the network plug-in 1040 appends the ASCII representation of the BCD coded phone number to the TP-UD 2160 message 5180, e.g., as described earlier with respect to FIG. 16. The originating address of the first user is appended to the MobileNumber field 5324, the home number of the first user is appended to the HomeNumber field 5332, and the work number of the first user is appended to the WorkNumber field 5342.

The network plug-in 1040 checks whether an end marker is requested at stage 5715. For example, referring to stage 5515 of the process 5500, if the network plug-in 1040 cannot "fake" the TP-OA from the incoming SMS header, then the network plug-in 1040 requests an end marker (e.g., which can signify to an application module receiving an SMS message with the end marker that it should ignore the TP-OA 2446 in the SMS—Deliver message 2410). If an end marker is requested, then process 5700 continues to stage 5720, otherwise, the process 5700 continues to stage 5725.

At stage 5720, the network plug-in 1040 appends the end marker to the TP-UD 2160 of the message 5180. The end marker for the MobileNumber field 5324 is an optional space 2325 and for the WorkNumber field 5342 is a mandatory space 5345.

At stage 5725, the network plug-in 1040 appends a NEW-LINE character 5310 to the TP-UD 2160 of the message 5180.

Figure 19:
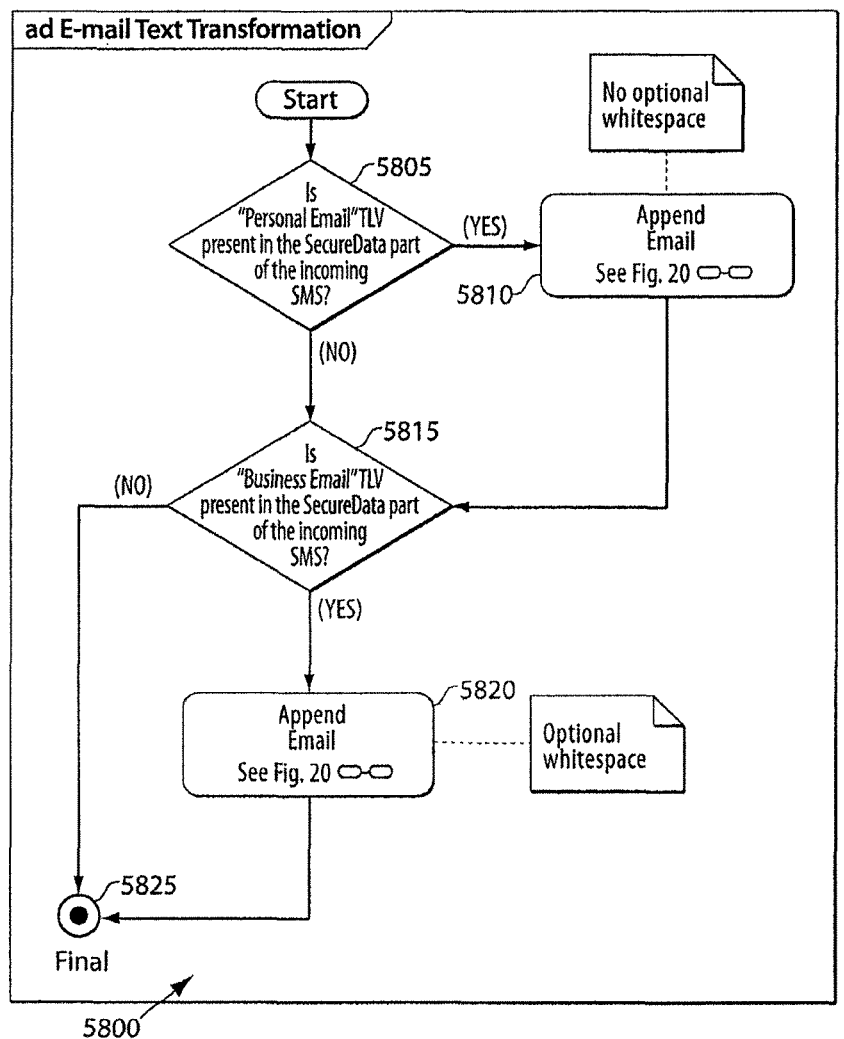
FIG. 19 is a block flow diagram of a process for E-mail text transformation.

In operation, with reference to FIG. 19 and further reference to FIGS. 11 and 17, a process 5800 for E-mail text transformation includes the stages shown. The process 5800, however, is exemplary only and not limiting. The process 5800 can be altered, e.g., by having stages added, removed, altered, and/or rearranged.

At stage 5805, the network plug-in 1040 checks to see if the TLV.sub.PE 5240 (e.g., the TLV value for PersonalEmail) is present in the secured data 2465 of the message 5170. If the TLV.sub.PE 5420 is present, the process 5800 continues to stage 5810, otherwise, the process 5800 continues to stage 5815.

At stage 5810, network plug-in 1040 appends information indicative of the TLV.sub.PE of the first user (e.g., see FIG. 20 and corresponding description) as an Email field 5350.

At stage 5815, the network plug-in 1040 checks to see if the TLV.sub.PE 5245 (e.g., the TLV value for BusinessEmail) is present in the secured data 2465 of the message 5170. If the TLV.sub.BE 5245 is present, the process 5800 continues to stage 5820, otherwise, the process 5800 ends.

At stage 5820 the network plug-in 1040 appends information indicative of the TVL.sub.BE of the first user to as the Email field 5350 and includes an optional white space 5355 (e.g., see FIG. 20 and corresponding description). If the Email field 5350 has already been generated because the network plug-in 1040 appended information indicative of the TLV-.sub.PE, the network plug-in 1040 appends an additional e-mail field to the text—SMS message.

In operation, with reference to FIG. 20 and with further reference to FIGS. 11 and 17, a process 5900 for appending an E-mail address includes the stages shown. The process 5900, however, is exemplary only and not limiting. The process 5900 can be altered, e.g., by having stages added, removed, altered, and/or rearranged.

At stage 5905, the network plug-in 1040 appends information indicative of the Email text to the TP-UD 2160 of the message 5180.

At stage 5910 the network plug-in 1040 checks to see if an optional white space 5355 is desired (e.g., if the E-mail address is a business address). If the optional white space 5355 is desired the process 5900 continues to stage 5915, otherwise, the process continues to stage 5920

At stage 5915, the network plug-in 1040 appends the white space 5355 after the Email field 5350 to the TP-UD 2160 of the message 5180.

At stage 5920 the network plug-in 1040 appends the NEW-LINE character 5310 after the Email field 5350 to the TP-UD 2160 of the message 5180.

Figure 21:
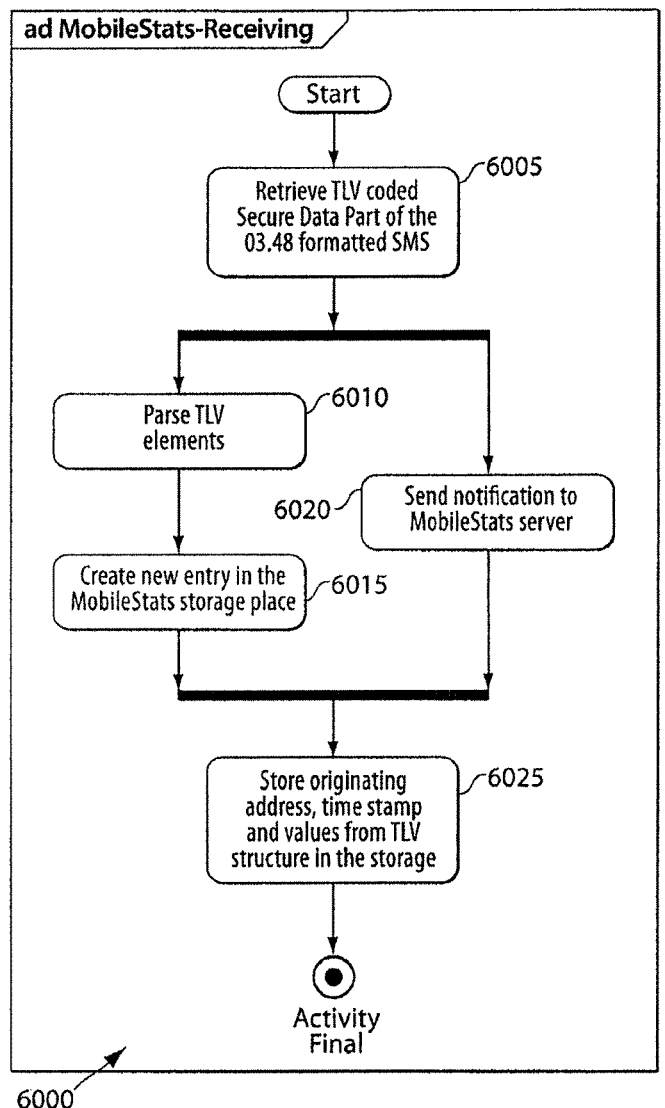
FIG. 21 is a block flow diagram of a process for receiving and processing SMS messages including statistical information.

In operation, with reference to FIG. 21 with further reference to FIG. 11, a process 6000 for receiving the MobileStats SMS message 1458 using the network plug-in 1040 includes the stages shown. The process 6000, however, is exemplary only and not limiting. The process 6000 can be altered, e.g., by having stages added, removed, altered, and/or rearranged. The process 6000 is described as if the MobileStats SMS message 1458 is the formatted binary SMS—Deliver message 2410, although other message types can be processed. Further, the process 6000 is described as if the message 5140 was determined to be the MobileStats SMS message 1458 by the process 3000.

At stage 6005 the network plug-in 1040 retrieves the TLV-coded secure data part of the MobileStats SMS message 1458.

At stage 6010 the network plug-in 1040 parses the TLV elements from the MobileStats SMS message 1458.

At stage 6015 the network plug-in 1040 creates a new entry in the statistics storage 1046.

At stage 6020 the network plug-in 1040 is sends a notification to the repository 1080 indicating that new MobileStats information is available.

At stage 6025 the network plug-in 1040 stores the originating address, the time stamp, and the TLV values in entry created in the statistics storage 1046.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

As described above, the network plug-in 1040 is configured to send one or more types of messages that include contact information to recipient communication devices. The network plug-in 1040, can also be configured to send a vCard to a recipient communication device. For example, the network plug in 1040 can be configured to determine if the recipient communication device is configured to receive and process vCards. The network plug-in 1040 is configured to check the IMEI database to determine if the recipient communication device is configured to accept a vCard. Using the information from the IMEI database, the network plug-in 1040 can determine if it is desired to send a vCard instead of a Formatted Binary SMS message to a recipient communication device.

While the network plug-in 1040 has been described as sending a user's contact information to a communication device, contact or other information can be sent to other devices and/or systems as well. For example, the network plug-in 1040 can be configured to send contact information to a personal computer as, for example, an e-mail. For example, the system 1000, can be configured such that after the communication device 1020 receives contact information from the communication device 1010, the communication device 1020 can prompt the second user to forward/send the contact information of the first user to the second user's personal computer. The application module 1025 is configured to send an SMS message to the network plug-in 1040 in which the second user's e-mail address is appended to the SMS message. The network plug-in 1040 is configured to recognize that the SMS message is intended for the second user's personal computer, and is configured to send an e-mail to the second user's personal computer that includes the contact information that is included in the SMS message. Upon receiving the e-mail containing the contact information, an application on the personal computer (e.g., Microsoft Outlook®) can receive the contact information e-mail add the first user's contact information to a contact list that is part of the application.

Further, while the description above refers to the invention, the description may include more than one invention.

The invention claimed is:

1. A non-transitory computer program product residing on a non-transitory computer readable medium and comprising non-transitory computer readable instructions configured to cause a computer to:
   receive a message of a first type from a first communication device, wherein the received message includes contact information related to a user of the first communication device;
   analyze the received message to determine information indicative of an address corresponding to a second communication device;
   determine whether the second communication device is configured to receive messages of the first type;
   send an outgoing message to the second communication device wherein:
      the outgoing message is of the first type if it is determined that the second communication device is configured to receive messages of the first type; and
      the outgoing message is of a second type if it is determined that the second communication device is not configured to receive messages of the first type.

2. The computer program product of claim 1 wherein the computer readable instructions are further configured to cause the computer to generate the outgoing SMS using the contact information related to the user of the first communication device.

3. The computer program product of claim 1 wherein the computer readable instructions are further configured to cause the computer to include information indicative of the contact information related to the use of the first communication device in the outgoing SMS.

4. The computer program product of claim 3 wherein the computer readable instructions are further configured to cause the computer to generate a formatted binary SMS message as the SMS message of the first type.

5. The computer program product of claim 4 wherein the computer readable instructions are further configured to cause the computer to format the information indicative of the contact information related to the user of the first communication device in a tag-length-value format.

6. The computer program product of claim 3 wherein the computer readable instructions are further configured to cause the computer to generate an unformatted text SMS message as the SMS message of the second type.

7. The computer program, product of claim 6 wherein the computer readable instructions are further configured to cause the computer to format the information indicative of the contact information related to the user of the first communication device using a plurality of text stings arranged in a predetermined format such that the second communication device can identify a characteristic related to the information, related to the information indicative of the contact information related to the first user.

8. A method executed by software running on electronic computer hardware, the method comprising:
   receiving a message of a first type from a first communication device, wherein the received message includes contact information related to a user of the first communication device;
   analyzing the received message to determine information indicative of an address corresponding to a second communication device;
   determining whether the second communication device is configured to receive messages of the first type;
   sending an outgoing message to the second communication device wherein:
      the outgoing message is of the first type if it is determined that the second communication device is configured to receive messages of the first type; and
      the outgoing message is of a second type if it is determined that the second communication device is not configured to receive messages of the first type.

9. The method of claim 8, further comprising generating the outgoing SMS using the contact information related to the user of the first communication device.

10. The method of claim 8 further comprising including information indicative of the contact information related to the user of the first communication device in the outgoing SMS.

11. The method of claim 10 further comprising generating a formatted binary SMS message as the SMS message of the first type.

12. The method of claim 11, further comprising formatting the information indicative of the contact information related to the use of the first communication device in a tag-length-value format.

13. The method of claim 10 further comprising generating art unformatted text SMS message as the SMS message of the second type.

14. The method of claim 13, further comprising formatting the information indicative of the contact information related to the user of the first communication device using a plurality of text stings arranged in a predetermined format such that the second communication device can identify a characteristic related to the information related to the information indicative of the contact information related to the first user.

15. A device for sharing identification related information, comprising:
   means for receiving a message of a first type from a first communication device, wherein the received message includes contact information related to a user of the first communication device;
   means for analyzing the received message to determine information indicative of an address corresponding to a second communication device;
   means for determining whether the second communication device is configured to receive messages of the first type;
   means for sending an outgoing message to the second communication device wherein:
      the outgoing message is of the first type if it is determined that the second communication device is configured to receive messages of the first type; and
      the outgoing message is of a second type if it is determined that the second communication device is not configured to receive messages of the first type.

16. The device of claim 15 further comprising means for generating the outgoing SMS using the contact information related to the user of the first communication device.

17. The device of claim 15 further comprising means for including information indicative of the contact information related to the user of the first communication device in the outgoing SMS.

18. The device of claim 17 further comprising means for generating a formatted binary SMS message as the SMS message of the first type.

19. The device of claim 18 further comprising means for formatting the information indicative of the contact information related to the user of the first communication device in a tag-length-value format.

20. The device of claim 18 further comprising generating an unformatted text SMS message as the SMS message of the second type.

21. The device of claim 18 further comprising means for formatting the information indicative of the contact information related to the user of the first communication device using a plurality of text stings arranged in a predetermined format such that the second communication device can identify a characteristic related to the information related to the information indicative of the contact information related to the first user.

22. An apparatus for use with communication devices, the communication devices being configured to send and receive messages, the apparatus comprising:
a processor configured to:
receive a message of a first type from a first communication device, wherein the received message includes contact information related to a user of the first communication device;
analyze the received message to determine information indicative of an address corresponding to a second communication device;
determine whether the second communication device is configured to receive messages of the first type;
send an outgoing message to the second communication device wherein:
the outgoing message is of the first type if it is determined that the second communication device is configured to receive messages of the first type; and
the outgoing message is of a second type if it is determined that the second communication device is not configured to receive messages of the first type.

23. The apparatus of claim 22 wherein the processor is further configured to generate the outgoing SMS using the contact information related to the user of the first communication device.

24. The apparatus of claim 22 wherein the processor is further configured to include information indicative of the contact information related to the user of the first communication device in the outgoing SMS.

25. The apparatus of claim 24 wherein the processor is further configured to generate a formatted binary SMS message as the SMS message of the first type.

26. The apparatus of claim 25 wherein the processor is further configured to format the information indicative of the contact information related to the user of the first communication device in a tag-length-value format.

27. The apparatus of claim 24 wherein the processor is further configured to generate an unformatted text SMS message as the SMS message of the second type.

28. The apparatus of claim 27 wherein the processor is further configured to format the information indicative of the contact information related to the user of the last communication device using a plurality of text stings arranged an predetermined format such that the second communication device can identify a characteristic related to the information related to the information indicative of the contact information related to the first user.

* * * * *

UNITED STATES PATENT AND TRADEMARK OFFICE
CERTIFICATE OF CORRECTION

PATENT NO.        : 8,467,816 B2                               Page 1 of 2
APPLICATION NO.   : 13/016470
DATED             : June 18, 2013
INVENTOR(S)       : Celik et al.

It is certified that error appears in the above-identified patent and that said Letters Patent is hereby corrected as shown below:

On the Title Page, Item (56), under "OTHER PUBLICATIONS", in Column 2, Line 1, delete "Applicatoin" and insert -- Application --, therefor.

On Title Page 3, Item (56), under "OTHER PUBLICATIONS", in Column 1, Line 5, delete "NY, NY," and insert -- NY, --, therefor.

In the Specification

In Column 3, Lines 19-20, delete "related to the information related to the information" and insert -- related to the information --, therefor.

In Column 14, Line 46, delete "TVL.sub.OA)" and insert -- TLV.sub.OA) --, therefor.

In Column 23, Line 33, delete "TVL.sub.BE" and insert -- TLV.sub.BE --, therefor.

In Column 23, Line 53, delete "stage 5920" and insert -- stage 5920. --, therefor.

In the Claims

In Column 25, Line 31, in Claim 3, delete "use" and insert -- user --, therefor.

In Column 25, Line 46, in Claim 7, delete "program," and insert -- program --, therefor.

In Column 25, Lines 52-53, in Claim 7, delete "related to the information, related to the information" and insert -- related to the information --, therefor.

In Column 26, Line 20, in Claim 12, delete "use" and insert -- user --, therefor.

Signed and Sealed this
Twentieth Day of May, 2014

Michelle K. Lee
*Deputy Director of the United States Patent and Trademark Office*

In Column 26, Line 23, in Claim 13, delete "art unformatted" and insert -- an unformatted --, therefor.

In Column 26, Line 30, in Claim 14, delete "related to the information related to the information" and insert -- related to the information --, therefor.

In Column 27, Lines 6-7, in Claim 21, delete "related to the information related to the information" and insert -- related to the information --, therefor.

In Column 28, Line 22, in Claim 28, delete "last" and insert -- first --, therefor.

In Column 28, Line 23, in Claim 28, delete "arranged an" and insert -- arranged in a --, therefor.

In Column 28, Lines 25-26, in Claim 28, delete "related to the information related to the information" and insert -- related to the information --, therefor.